United States Patent
Berlich et al.

(10) Patent No.: US 10,324,306 B2
(45) Date of Patent: Jun. 18, 2019

(54) DEVICE FOR MEASURING AN ABERRATION, IMAGING SYSTEMS AND METHODS FOR MEASURING AN ABERRATION

(71) Applicant: Fraunhofer-Gesellschaft zur Foerderung der angewandten Forschung e.V., Munich (DE)

(72) Inventors: René Berlich, Jena (DE); Claudia Reinlein, Jena (DE)

(73) Assignee: Fraunhofer-Gesellschaft zur Foerderung der angewandten Forschung e.V., Munich (DE)

(*) Notice: Subject to any disclaimer, the term of this patent is extended or adjusted under 35 U.S.C. 154(b) by 0 days.

(21) Appl. No.: 15/631,882

(22) Filed: Jun. 23, 2017

(65) Prior Publication Data
US 2017/0371176 A1    Dec. 28, 2017

(30) Foreign Application Priority Data
Jun. 23, 2016    (DE) .................. 10 2016 211 310

(51) Int. Cl.
*G02B 27/62* (2006.01)
*G01J 9/00* (2006.01)
(Continued)

(52) U.S. Cl.
CPC ............... *G02B 27/62* (2013.01); *G01J 9/00* (2013.01); *G02B 7/185* (2013.01); *G02B 26/06* (2013.01);
(Continued)

(58) Field of Classification Search
CPC ........ G02B 27/62; G02B 7/185; G02B 26/06; G02B 27/18; G01J 9/00; G01J 2009/004;
(Continued)

(56) References Cited

U.S. PATENT DOCUMENTS

| | | | |
|---|---|---|---|
| 4,696,573 A | 9/1987 | Hutchin | |
| 4,824,243 A | 4/1989 | Wheeler et al. | |

(Continued)

FOREIGN PATENT DOCUMENTS

| | | | | |
|---|---|---|---|---|
| CN | 101614593 A | * | 12/2009 | ............ G01J 9/00 |
| EP | 1204893 A1 | * | 5/2002 | ......... G11B 7/1353 |

(Continued)

OTHER PUBLICATIONS

Blanchard, Paul M. et al., "Measurements of Low-Level Atmospheric Turbulence", Part of the SPIE Conference on Optics in Atmospheric Propagation and Adaptive Systems III, Florence, Italy, Sep. 1999, 135-142.

(Continued)

*Primary Examiner* — Jamil Ahmed
(74) *Attorney, Agent, or Firm* — Perkins Coie LLP; Michael A. Glenn

(57) ABSTRACT

A device for measuring an aberration has an image sensor, projection optics for optically projecting onto the image sensor, an optical unit for influencing the optical projection onto the image sensor so that the result on the image sensor is a multiple image of a plurality of sub-images, wherein the optical unit has at least one region per sub-image, wherein the regions influence different lateral portions of a wavefront incident on the projection optics in different ways, and an evaluator configured to determine information relating to the aberration based on the multiple image.

27 Claims, 17 Drawing Sheets

(51) Int. Cl.
*G02B 7/185* (2006.01)
*G02B 27/18* (2006.01)
*G02B 26/06* (2006.01)

(52) U.S. Cl.
CPC ........ *G02B 27/18* (2013.01); *G01J 2009/004* (2013.01)

(58) Field of Classification Search
CPC ... H04N 7/18; G06K 9/64; H05G 1/64; H01L 27/00; G06F 17/14; G05B 13/02; A61B 3/10; A61B 3/14; A61B 8/06
See application file for complete search history.

(56) References Cited

U.S. PATENT DOCUMENTS

| | | | |
|---|---|---|---|
| 5,278,402 A * | 1/1994 | Wein | G01N 21/41 250/201.9 |
| 7,268,937 B1 | 9/2007 | Andersen et al. | |
| 7,531,774 B2 | 5/2009 | Paxman et al. | |
| 7,554,672 B2 | 6/2009 | Greenaway et al. | |
| 7,705,970 B2 | 4/2010 | Piestun et al. | |
| 8,517,535 B2 | 8/2013 | Raymond et al. | |
| 8,649,630 B2 * | 2/2014 | Liu | G06T 5/001 382/275 |
| 8,907,260 B2 | 12/2014 | Restaino et al. | |
| 2003/0006364 A1 * | 1/2003 | Katzir | G01N 21/8851 250/208.1 |
| 2005/0286018 A1 * | 12/2005 | Yamaguchi | A61B 3/14 351/205 |
| 2006/0106309 A1 * | 5/2006 | Liu | G01S 7/52049 600/447 |
| 2011/0054693 A1 * | 3/2011 | Dean | G05B 23/024 700/275 |
| 2012/0242831 A1 * | 9/2012 | Restaino | G01J 9/00 348/135 |
| 2014/0015935 A1 | 1/2014 | Piestun et al. | |

FOREIGN PATENT DOCUMENTS

| | | |
|---|---|---|
| EP | 1983318 A1 | 10/2008 |
| WO | 2004113856 A1 | 12/2004 |
| WO | 2009058747 A1 | 5/2009 |

OTHER PUBLICATIONS

Gonsalves, Robert A., "Phase Retrieval and Diversity in Adaptive Optics", Optical Engineering vol. 21 No. 5, Oct. 1982, 829-832.
Neil, Mark A. et al., "New Modal Wave-Front Sensor: A theoretical Analysis", J. Opt. Soc. Am. A/vol. 17, No. 6, Jun. 2000, 1098-1107.
Roddier, Francois et al., "Curvature Sensing: A New Wavefront Sensing Method", SIPE vol. 976 Statistical Optics, 1988, 203-209.
Simonov, Aleksey N. et al., "Passive Ranging and Three-Dimensional Imaging Through Chiral Phase Coding", Optics Letters vol. 36, No. 2, Jan. 15, 2011, 115-117.
Wang, Jianxin et al., "Wavefront response matrix for closed-loop adaptive optics system based on non-modulation pyramid wavefront sensor", Optics Communications 285 (2012), Feb. 26, 2012, 2814-2820.

* cited by examiner

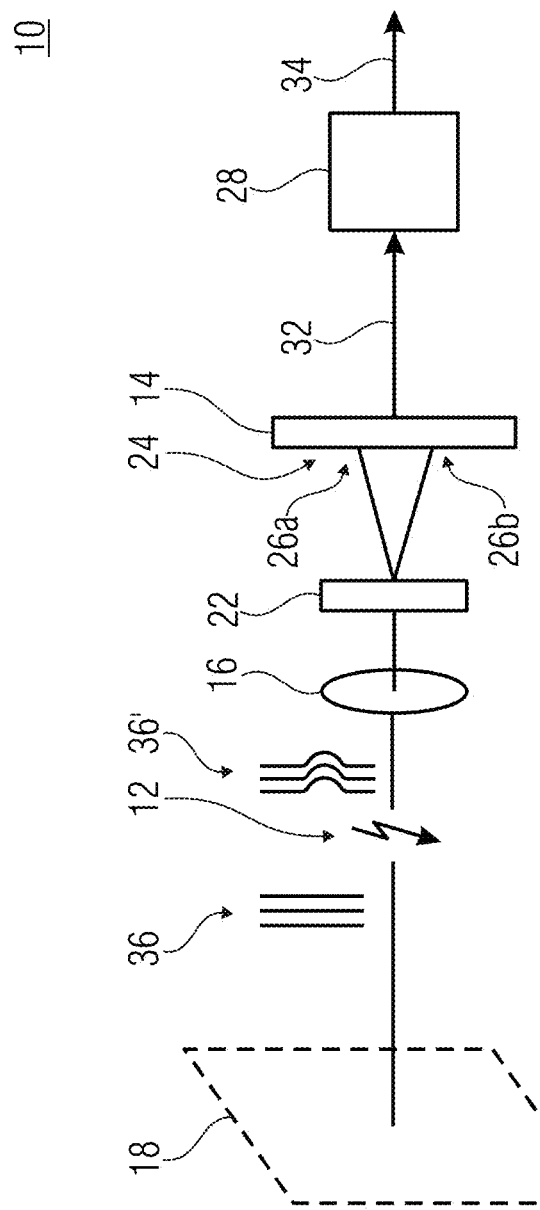

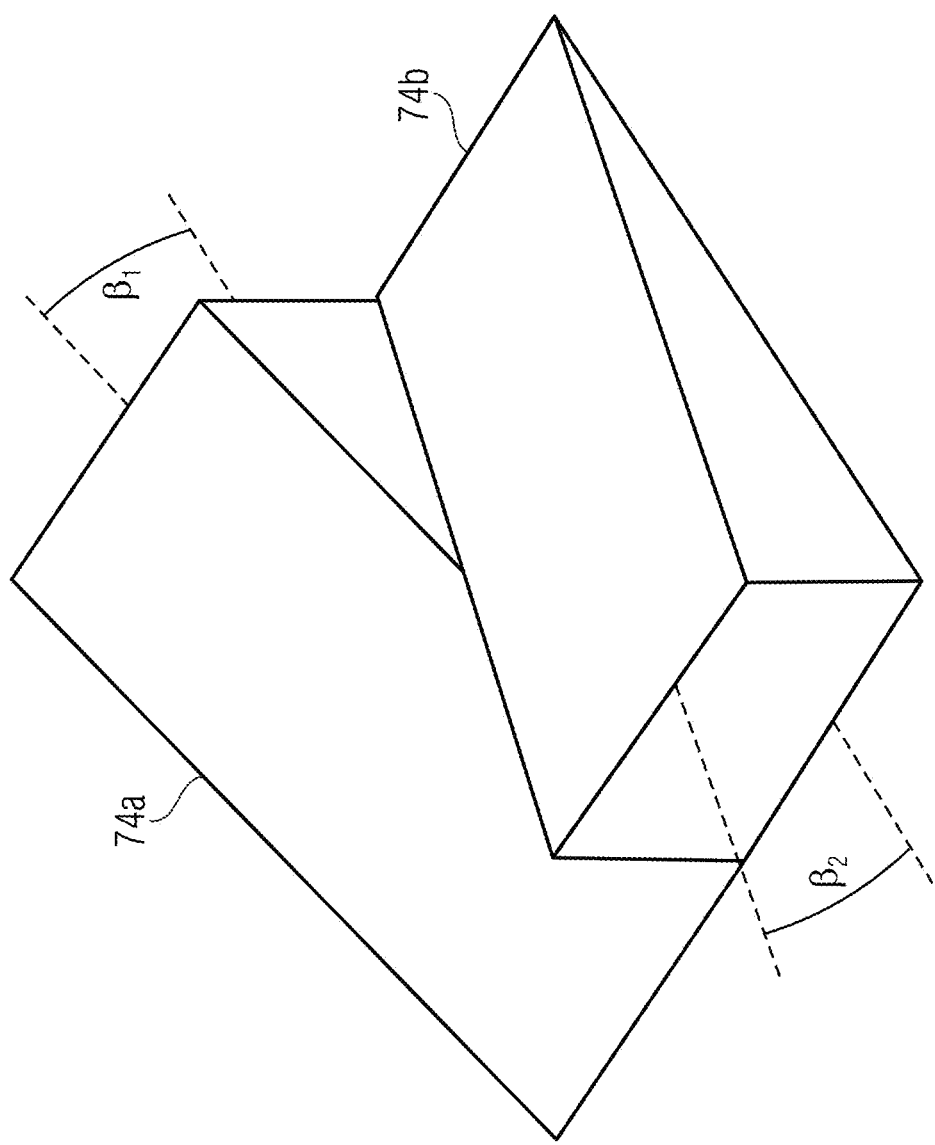

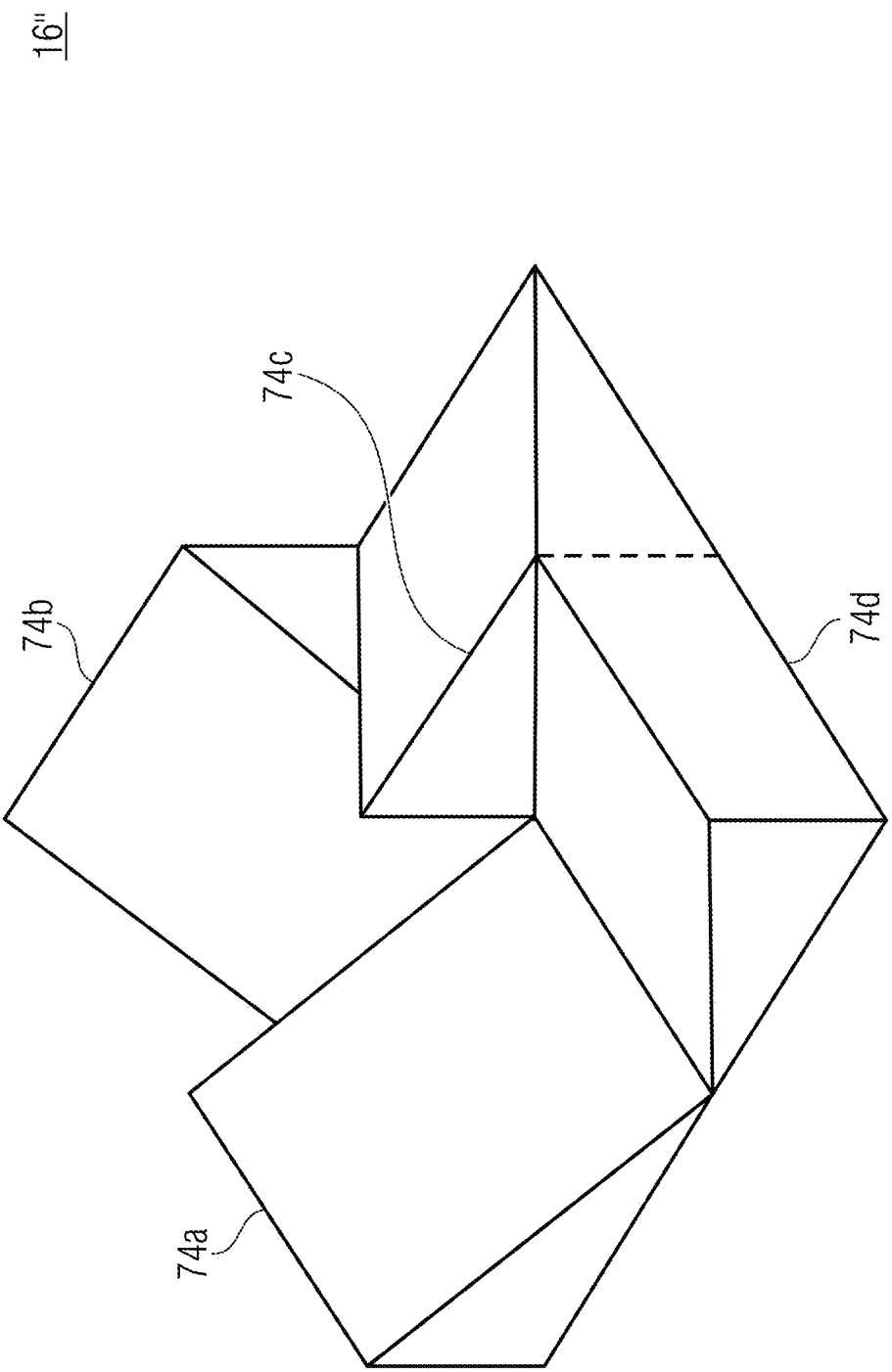

DEVICE FOR MEASURING AN ABERRATION, IMAGING SYSTEMS AND METHODS FOR MEASURING AN ABERRATION

CROSS-REFERENCE TO RELATED APPLICATION

This application claims priority from German Application No. 10 2016 211 310.0, which was filed on Jun. 23, 2016, and is incorporated herein by reference in its entirety.

BACKGROUND OF THE INVENTION

The present invention relates to a device for measuring an aberration, to imaging systems comprising such a device, and to a method for measuring an aberration. The present invention particularly relates to arrangements and methods for measuring aberrations by means of optical wavefront encoding.

When light propagates through the atmosphere starting from an object, turbulence results in a spatial and temporal variation of the optical path towards a target. The result of this is that when passively observing the object or when actively illuminating the object by means of an optical system, the wavefront is deformed, which is referred to as aberration. The imaging quality and/or illuminating quality is/are decreased by aberrations. The imaging quality and/or illuminating quality may be quantified by means of the magnitude of the Strehl ratio S. Thus, a value of S=1 corresponds to ideal imaging (with limited diffraction). Mechanical deformations, like vibrations or weight-induced deformations, or thermal deformations within the optical system, and classical aberrations, like a spherical aberration, astigmatism, coma or the like, are of equivalent influence for the imaging/illuminating quality. By means of active optical elements, like a tilting mirror or deformable mirror, it is possible in principle to compensate said influence at least partly in order in increase the imaging/illuminating quality or decrease the influence of the aberrations of the wavefront. However, measuring the spatial and temporal distribution of the wavefront at the observing/illuminating system may be involved here.

Approaches for wavefront/aberration measurements are described in EP 1 983 318 A1, for example. Measuring the wavefront is done by means of a Shack-Hartmann sensor or a plenoptic camera. The aberration of the wavefront in the pupil or lens of the optical system is measured by means of a micro lens array. Thus, the micro lens array generates several, spatially separate imagings of an observed object. The relative position of the multiple imaged object features relative to one another provide information on the wavefront. However, this approach uses a point-light source for the imaging object in order to measure the wavefront However, this cannot be realized in many application scenarios. Alternatively, an extensive object may also be used, however certain object details are identified here in order to numerically reconstruct the wavefront. Due to the very low resolution (object scanning) due to the extremely small focal length of the micro lens array, identification is possible only to a very limited extent, and in many application scenarios, not at all.

Another approach described in U.S. Pat. No. 4,696,573 A suggests measuring the wavefront by means of a Shearing interferometer. A point-light source is observed here. Interference patterns of the wavefront are examined in order to reconstruct the wavefront and, thus, the aberration. However, a point-light source is used here for the object/target.

Another approach described in U.S. Pat. No. 8,907,260 B2 suggests using autocorrelation. The object distribution is measured here at different points in time. A tip/tilt aberration can be measured by means of autocorrelation of the images measured. However, this concept is of disadvantage in that several pictures are taken. The aberrations can be measured only relatively in relation to one of the pictures. Since in particular atmospheric aberrations are subject to a high change rate, disadvantages result.

Another approach described in U.S. Pat. No. 7,268,937 B1 relates to a holographic wavefront sensor. Here, the super positioning of a reference wavefront with a second wavefront which represents a certain aberration, like a Zernike mode, as a holographic optical element (HOE) is captured. When said HOE is introduced into the optical path of a wavefront to be examined, the contribution of the wavefront which corresponds to the same Zernike mode of the picture, is diffracted in two opposite orders. The relative intensity of the diffraction orders provides information on the intensity/amplitudes of the aberration. However, this concept is of disadvantage in that a point-light source is used for the object/target. In addition, the concept is of disadvantage in that it may be applied only for a narrow-band wave length spectrum.

Another approach described in U.S. Pat. No. 7,554,672 B2 relates to considering phase diversity and a curved sensor. The target here is observed at different focal settings and is observed in different diffraction orders of a diffractive element, as is described, for example, in WO 2009/058747 A1, U.S. Pat. No. 7,554,672 B2, WO 2004/113856 A1, U.S. Pat. No. 8,517,535 B2 or U.S. Pat. No. 7,531,774 B2. The wavefront aberration can be reconstructed from the different image distributions. This concept is of disadvantage in that either several optical imaging systems and image sensors are present or the images are taken in a temporally offset manner, resulting in reduced measuring speed. In addition, the concept is of disadvantage in that the reconstruction is numerically highly complicated for extensive object distributions and, thus, the measuring speed is also limited.

Consequently, a concept which allows considering or correcting aberrations also for extensive objects having little object details at high a measuring speed would be desirable.

Consequently, the object underlying the present invention is providing a device for measuring an aberration which is able to provide information relating to the aberration at high a measuring speed for both small (point) sources and also extensive objects exhibiting only a few details ("features").

SUMMARY

According to an embodiment, a device for measuring an aberration may have: an image sensor; projection optics for optically projecting onto the image sensor; optical means for influencing the optical projection onto the image sensor so that the result on the image sensor is a multiple image of a plurality of sub-images, wherein the optical means has at least one region per sub-image, wherein the regions influence different lateral portions of a wavefront incident on the projection optics in different ways; and evaluating means configured to determine information relating to the aberration on the basis of the multiple image.

According to another embodiment, an imaging system may have: a device as mentioned above; adjusting means configured to adjust the projection optics using the information relating to the aberration such that an influence of the aberration on the projection onto the image sensor is reduced compared to a state detected by the device; and control means for controlling the optical means such that the same is arranged in a first time interval in order to influence the optical projection onto the image sensor such the result is the multiple on the image sensor; and such that the same is arranged in a second time interval in order to influence the optical projection onto the image sensor at least to an extent smaller compared to the first time interval.

According to still another embodiment, an imaging system may have: a device as mentioned above, wherein the image sensor is a first sensor, and wherein the projection optics are first projection optics; a second image sensor; second projection optics for optically projecting onto the second image sensor; and adjusting means configured to adjust the second projection optics using the information relating to the aberration such that an influence of the aberration on the projection onto the second image sensor is reduced compared to a state detected by the device.

According to another embodiment, a method for measuring an aberration may have the steps of: providing an image sensor; arranging projection optics for optically projecting onto the image sensor; influencing the optical projection onto the image sensor by optical means so that the result is a multiple image on the image sensor; and determining information relating to the aberration based on the multiple image.

The central idea of the present invention is having recognized that the above object can be achieved by influencing an optical projection onto an image sensor by optical means such that a multiple image if formed on the image sensor. The multiple image provides information relating to the aberration, which can be evaluated so that the information relating to the aberration can be obtained based on evaluating the multiple image and, thus, may be a single picture taken, which entails little calculating complexity and, consequently, can be performed quickly. In addition, by using the multiple image, an extensive object can also be used as the source since individual features of the extensive objects are also located several times in the multiple image.

In accordance with an embodiment, a device for measuring an aberration comprises an image sensor, projection optics for optically protecting onto the image sensor, optical means for influencing the optical projection onto the image sensor such that the result on the image sensor is a multiple image, and evaluating means configured to determine information relating to the aberration on the basis of the multiple image. It is of advantage that the information relating to the aberration can be obtained from the multiple image quickly and even for large object extensions. Compared to evaluating on several image sensors, a relative position of individual features can be evaluated at high precision and simultaneously.

In accordance with another embodiment, the evaluating means is configured to evaluate the multiple image using pattern recognition and to determine the information relating to the aberration based on the pattern recognition. It is of advantage here that the information relating to the aberration can be determined already using the pattern in the multiple image so that evaluating the entire multiple image may be omitted, thereby meaning only little computing performance.

In accordance with another embodiment, the optical means is configured to influence the optical projection such that a first type of aberration causes a first change, associated to the first type, in pattern in the multiple image, and such that a second type of aberration causes a second change, associated to the second type, in pattern in the multiple image. It is of advantage that the type of aberration can be deduced based on the change of the pattern in the multiple image, like a change in rotation or change in distance between individual features.

In accordance with another embodiment, the evaluating means is configured to calculate a cepstrum of the optical projection and to determine from the cepstrum the information relating to the aberration. It is of advantage here that the cepstrum can be calculated at comparatively little calculating complexity and at the same time allows high detectability of side maximums of the results obtained so that a quick and reliable recognition of object features is possible.

In accordance with another embodiment, the optical means comprise a diffractive optical element for generating the multiple image. It is of advantage here that the diffractive optical element may be implemented such that it associates different influences on a point spread functions (PSF) to different types of aberrations, which means that different influences of the multiple image are done under the influence of different types of aberrations. These different influences can be evaluated advantageously in the optical projection. In addition, the multiple image can be generated by the diffractive element without reducing the projections/imaging scale of the projection optics.

In accordance with another embodiment, the multiple image comprises a plurality of individual images which overlap partly. It is of advantage here that the demand for image sensor area can be kept small despite generating a multiple image, or else the imaging scale of the projection optics does not have to be reduced and at the same time the information relating to the aberration can be determined. Exemplarily, a specific feature arranged in each of the individual images can be evaluated relative to one another since this specific features can be recognized and identified even when the individual images overlap.

In accordance with another embodiment, an imaging system comprises a device for measuring an aberration, adjusting means configured to adjust the projection optics using the information relating to the aberration such that an influence of the aberration on the projection onto the image sensor is reduced compared to a state detected by the device. The imaging system additionally comprises control means for controlling the optical means. The control means is configured to control the optical means such that the same is arranged in a first time interval in order to influence the optical projection onto the image sensor such that the multiple image forms on the image sensor, and to drive the optical means such that the same is arranged in a second time interval in order to influence the optical projection onto the image sensor to an extent reduced at least compared to the first time interval. In a non-final way this includes the optical means to be arranged in the optical path in the first interval and not to be arranged in the optical path in the second time interval. This is of advantage in that, in the first time interval, a correction of the aberration can be determined and, in the second time interval, the optical projection can be detected at reduced influence of the aberration using the same optical means.

In accordance with another embodiment, an imaging system comprises a device for measuring an aberration, another, second image sensor, other, second projection optics for optically projection onto the second image sensor, and adjusting means configured to adjust the second projection optics using the information relating to the aberration such that an influence of the aberration on the projection onto the second image sensor is reduced compared to a state detected by the device for measuring an aberration. Expressed in a simplified manner, the device for measuring an aberration may also be used in the imaging system as an additional device for correcting another imaging system which comprises the second image sensor. This is of advantage in that the device for measuring the aberration may also be used for other imaging systems.

In accordance with another embodiment, a method for measuring an aberration comprises providing an image sensor, arranging projection optics for optically projecting onto the image sensor, influencing the optical projection onto the image sensor using optical means such that the result on the image sensor is a multiple image, and determining information relating to the aberration on the basis of the multiple image.

BRIEF DESCRIPTION OF THE DRAWINGS

Embodiments of the present invention will be detailed subsequently referring to the appended drawings, in which:

FIG. 1 is a schematic block circuit diagram of a device for measuring an aberration in accordance with an embodiment;

FIG. 2a is a schematic perspective view of optical means in accordance with an embodiment, comprising a first prism and a second prism for generating the multiple image;

FIG. 2b is a schematic perspective view of optical means in accordance with an embodiment, comprising, when compared to FIG. 2a, a higher number of prisms for generating the multiple image;

DETAILED DESCRIPTION OF THE INVENTION

Figure 2C:
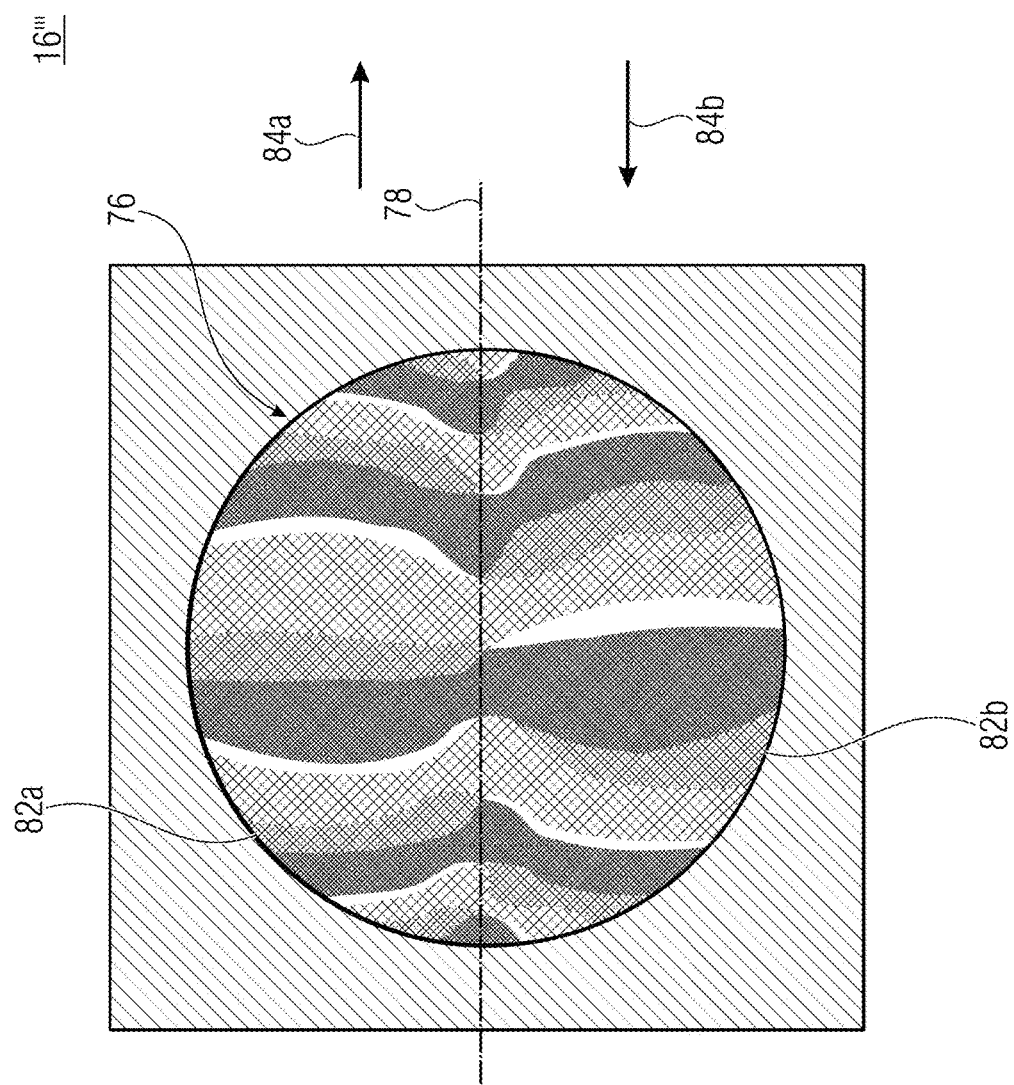
FIG. 2c is a schematic top view of optical means in accordance with an embodiment, comprising a diffractive element having two effective areas.

Before discussing embodiments of the present invention below in greater detail referring to the drawings, it is to be pointed out that identical elements, objects and/or structures or those of equal function or equal effect, are provided with same reference numerous in the different Figures so that the description of these elements illustrated in different embodiments is mutually exchangeable or mutually applicable.

FIG. 1 shows a schematic block circuit diagram of a device 10 for measuring an aberration 12. Aberration in this context is to be understood to mean any type of imaging error in an optical system. The aberration 12 may, for example, be defocusing of the optical projection onto an image sensor 14, a coma aberration of the optical projection, and astigmatism of the optical projection and/or a Zernike mode. A coma aberration, i.e. an asymmetry error, may, for example, form in a bundle of rays incident obliquely to the optical axis, by overlapping of two imaging errors. This may, for example, be a spherical aberration in an axis-parallel bundle of rays and astigmatism of skewed bundles. The aberration 12 may be influenced or provoked by atmospherical disturbances, like temperature differences in different layers of the air, and/or by components of the device 10. Mechanical thermal deformations of imaging optics 16 and/or deformations resulting in changes in distance between the imaging optics 16 and the image sensor 14 may result in aberrations.

The device 10 comprises an image sensor 14 and projection optics 16 for an optical projection onto the image sensor 14. Exemplarily, the device 10 may be configured to project, i.e. image, an object region 18 onto the image sensor 14 while using the projection optics 16. The projection optics 16 may be implemented to be a lens, lens combination or comprise other imaging elements. The projection optics may be provided to allow common focusing of the imaging. The device 10 additionally comprises optical means 22 for influencing the optical projection onto the image sensor 14 so that the result on the image sensor 14 is a multiple image 24. The optical means 22 here may comprise at least one suitable optical element in order to allow generating at least two individual images 26a and 26b from a scene captured, for example a diffractive element, a combination of at least two prisms or a beam splitter. Based on common focusing of the projection optics 16, the multiple image and, thus, the individual images 26a and 26b may, at least in the absence of an aberration, also comprise common focusing, i.e. focusing is influenced only insignificantly by the optical means 22. Generating the individual images 26a and 26b from the optical path here may be done in transmission and/or reflection. A number of the individual images 26a and 26b of the multiple image 24 may be any number of at least two, like two, three, four or more.

It is of advantage with a diffractive element that it does not generate an image itself, which may also be understood to mean that the focal length is "infinite". Thus, the projection scale of the imaging optics 16 is not influenced, which means that sub-images of the multiple images may overlap. Object scanning by the imaging optics 16 consequently is not reduced, which means that even small object features can be resolved in order to measure the aberrations in a more robust manner.

The multiple image 24 may comprise a plurality of individual images 26a and 26b, which means that the optical means 22 is configured to cause a multiple projection onto the image sensor 14. The individual images may be projected onto the image sensor 14 separately or spaced apart from one another. A distance at which the individual images 26a and 26b are projected onto the image sensor 14, like a distance between geometrical central points, may be influenced by the optical means 22. An overlapping of the individual images may be at least influenced by an extension of the scene detected in the object region. Thus, point sources or small scenes may, for example, be projected onto the image sensor 14 separately, whereas individual images of extensive scenes overlap one another.

The optical means 22 may be configured to project the individual images 26a and 26b onto the image sensor 14 with a predetermined positioning to each other in interference-free capturing. The optical means 22 may, for example, be configured to generate a number of two individual images 26 and to shift these to each other in an axis-symmetrical manner relative to a symmetry axis determined by the optical means 22. Alternatively, the optical means 22 may be configured to generate a number of four individual images 26 and to shift these to one another in an axis-symmetrical manner relative to two symmetry axis determined by the optical means 22, like in an angle of 90° to one another and relative to an image surface of the image sensor 14. Alternatively, any other association may be implemented in the optical means 22, like a number of three individual images 26 and/or unequal angles relative to one another, like angles of 90°, 110° and 160° to one another, or any other value which in sum is 360°.

The device 10 comprises evaluating means 28 configured to obtain information from the image sensor 14, like in the form of an image signal 32 provided by the image sensor 14. The information may thus be the image data of the multiple image 24. The evaluating means 28 is configured to determine information relating to the aberration on the basis of the multiple image 24 detected by the image sensor 14 and provided by means of the image signal 32. The evaluating means 28 may be configured to provide an output signal 34, including the information relating to the aberration 12, or information derived from this. The evaluating means 28 is, for example, configured to compare the multiple image 24 (real state) to a set state of the multiple image 24 in order to obtain the information relating the aberration 12. This may take place independently of the actually detected object region since a number of individual images 26 and the arrangement thereof among one another can be determined in the optical means 22. Consequently, each feature of the detected object region may be present in the number of individual images 26, irrespective of the object region detected. The evaluating means 28 may be configured to determine equal or similar features (objects) in the individual images 26 and to use these feature for determining the information relating to the aberration 12.

The aberration 12 may cause deformation of a wavefront 36, as is illustrated by a deformed wavefront 36'. The aberration 12 may be any aberration occurring between the object region 18 and the diffractive element 22.

The optical means 22 may be arranged in the pupil of the projection optics 16 or in a tolerance region around the pupil, i.e. a pupil region. The pupil region may, for example, be arranged within a region of ±15%, ±10% or ±5% of a cross section of the pupil of the projection optics 16. Expressed in a simplified manner, this means that the optical means may be arranged in a region through which all of or at least a large part of at least 75%, at least 90% or at least 95% of the object points of the scene recorded pass since all the bundles of rays comprise at least approximately the same position. The pupil region may also be understood to be close to or as close as possible to the projection optics 16. Thus, the entire wavefront 36' may impinge on the optical means. The entire wavefront may thus be deflected by different regions in the optical means in different ways and for generating the different sub-images 26a and 26b. An aberration may result in a changed position of the sub-images in the multiple image which can be evaluated easily, quickly, i.e. at little calculating complexity, and in a robust manner.

The evaluating means 28 may be configured to evaluate the multiple image using pattern recognition and to determine the information relating to the aberration 12 based on the pattern recognition. The pattern may, for example, be a shift and/or distortion in the multiple image 24 or at least a feature of one of the individual images 26a and/or 26b, determined by the evaluating means 28. The evaluating means 28 may deduce the occurrence and/or the type and/or the intensity (amplitude) of the aberration 12, for example by comparing at least one feature to reference information (set state). An influence matrix may, for example, be stored as reference information in the evaluating means 28 or in a storage accessible for the evaluating means 28. The influence matrix may, for example, comprise information on which type or/which intensity of aberration has which effect on the multiple image 24, and can be obtained when calibrating. Alternatively or additionally, further reference information, like an inverse influence matrix, may be stored in the evaluating means 28 or a storage accessible for the evaluating means 28, providing information on how at least one optical component of an optical system is to be influenced in order to reduce the influence of the aberration 12 or, in the ideal case, compensate same. The effect of the aberration may, for example, be obtained by the influence matrix and an instruction for reducing same by the inverse influence matrix. Reducing may, for example, comprise influencing an optical element, as will be discussed below.

In other words, the optical means 22 comprises an optical element, like a diffractive one, which changes the wavefront of the entire system such that double/multiple images are generated in the image plane.

Although the optical means 22 is illustrated so as to be arranged between the projection optics 16 and the image sensor 14, the optical means 22 may also be arranged at a different location, like on a side of the projection optics 16 facing away from the image sensor 14. The projection optics 16 may also comprise several optical elements which may each be formed as a lens, mirror, prism or alike, independently of one another. The optical means 22 may be arranged between two optical elements of the projection optics 16.

FIG. 2a shows a schematic perspective view of optical means 22' comprising a first prism 74a and a second prism 74b for generating the multiple image. The optical means 22' comprises one region per sub-image generated. The regions, i.e. prisms, influence different lateral portions of the wavefront impinging on the projection optics in different ways. The prisms 74a and 74b are, for example, arranged next to each other and tilted relative to each other, i.e. tilted by mutually different angles $\beta_1$ und $\beta_2$. The angles $\beta_1$ und $\beta_2$ may exhibit equal magnitudes, but in this case differ in their orientation. The angles $\beta_1$ und $\beta_2$ may, for example, be oriented to be discordant (by 180°) to each other in space. The prism arrangement is configured to generate the multiple image such that it comprises two sub-images or images the object region twice. Each of the prisms 74a and 74b forms a region of the optical means 22'. Due to the different angles of the prisms 74a and 74b relative to the incoming wavefront and/or substrate surface, every respective part of the impinging wavefront may be deflected to a different direction when generating the multiple image, wherein the focus is the same for the entire wavefront.

FIG. 2b shows a schematic perspective view of optical means 22' comprising a higher number of, like four, prisms 74a to 74d for generating the multiple image. The prisms may be tilted relative to a substrate surface or an image surface at angles of equal magnitude or different angles and comprise a mutually different orientation in space. Tilting of the prism 74b, for example, may be rotated or twisted by 180° relative to a tilting of the neighboring prism 74c, but only by 90° relative to a tilting of the also neighboring prism 74a. The rotation of the prisms and/or the angles of the prisms may take any value. The prism arrangement is configured to generate the multiple image such that it comprises four sub-regions or images the object region four times, matching the number of prisms.

FIG. 2c shows a schematic top view of optical means 22''' comprising a diffractive element 76. The top view shows an exemplary altitude profile of the diffractive element 76, wherein lighter a shading means greater a thickness and vice versa. The diffractive element is configured to generate the multiple image such that it comprises two sub-images or images the object region twice. Here, the diffractive element 76 comprises two regions 82a and 82b illustrated to be separated by a virtual line 78, configured to redirect part of the impinging wavefront to a respective different direction 84a and 84b so as to generate the multiple image. Thus, each sub-image may be generated by a part of the wavefront differing partly or completely from other parts.

Figure 2D:
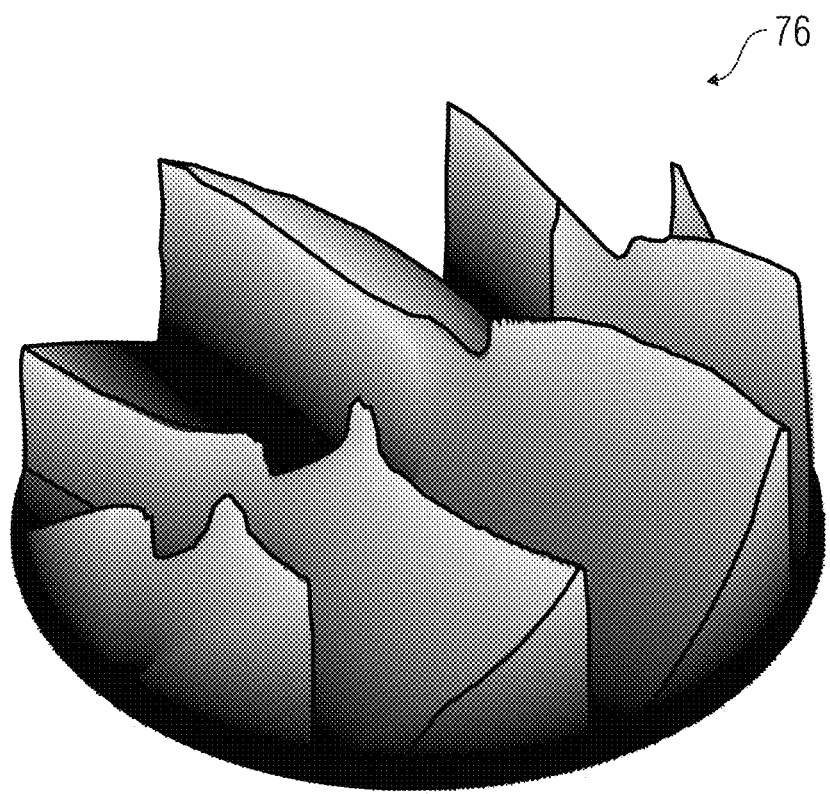
FIG. 2d is a schematic perspective view of the diffractive element of FIG. 2c.

FIG. 2d shows a schematic perspective view of the diffractive element 76.

Figure 2E:
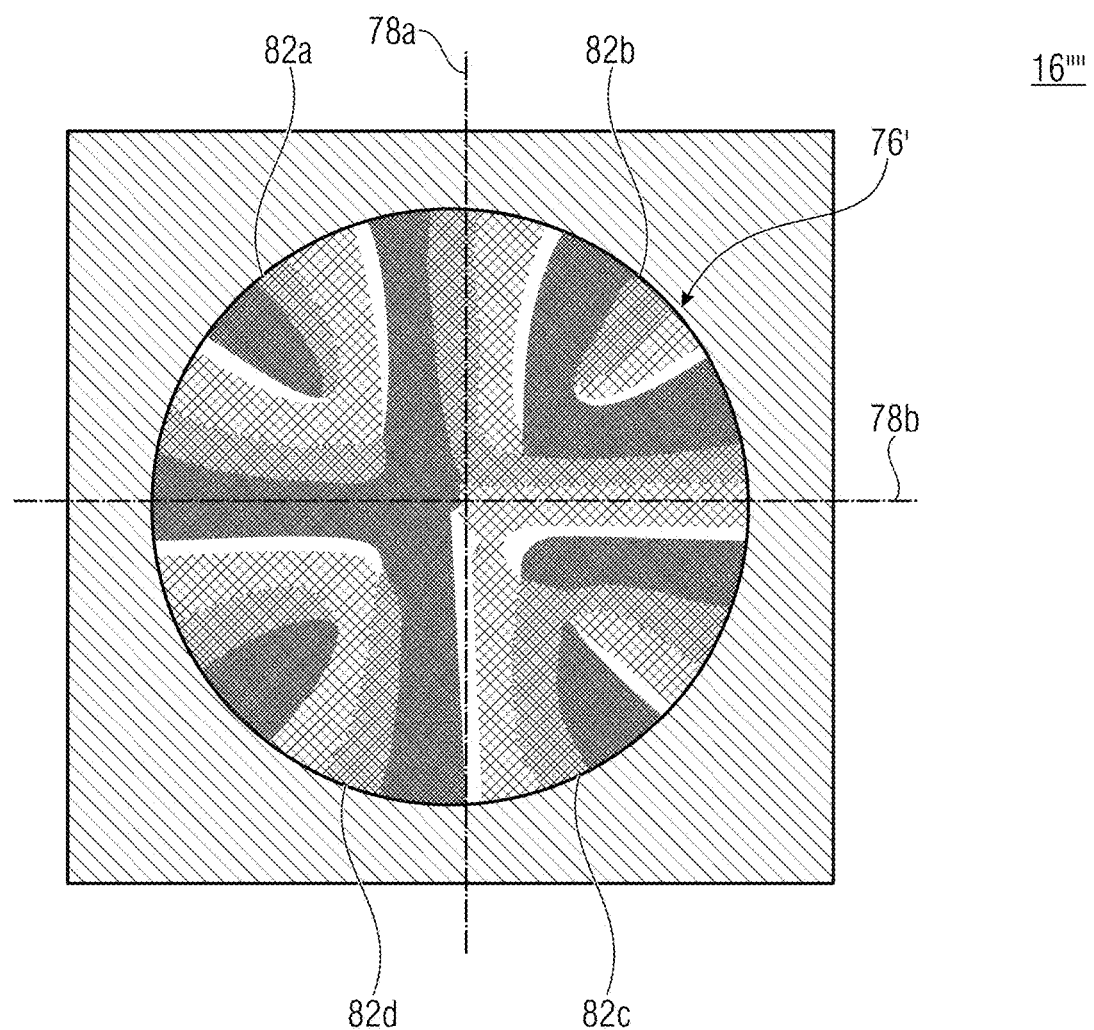
FIG. 2e is a schematic top view of optical means in accordance with an embodiment, comprising a diffractive element having four effective areas.

FIG. 2e shows a schematic top view of optical means 22'''' comprising a diffractive element 76'. The top view shows an exemplary altitude profile of the diffractive element 76', wherein lighter a shading means greater a thickness and vice versa. The diffractive element is configured to generate the multiple image such that it comprises four sub-images or images the object region four times. Here, the diffractive element 76' comprises four regions 82a to 82d illustrated to be separated by two virtual lines 78a and 78b, configured to redirect respective parts of the impinging wavefront to a mutually different direction s as to generate the multiple image. When using diffractive elements, the focus of the individual images of the multiple image may also be the same. Thus, each sub-image may be generated by a part of the wavefront differing partly or completely from other parts.

In accordance with further embodiments, the optical means may comprise a number M of effective regions, differing from two or four, like 3, 5 or even more, so that said very number of sub-images N and at least N=2 sub-images are generated at most.

Figure 2F:
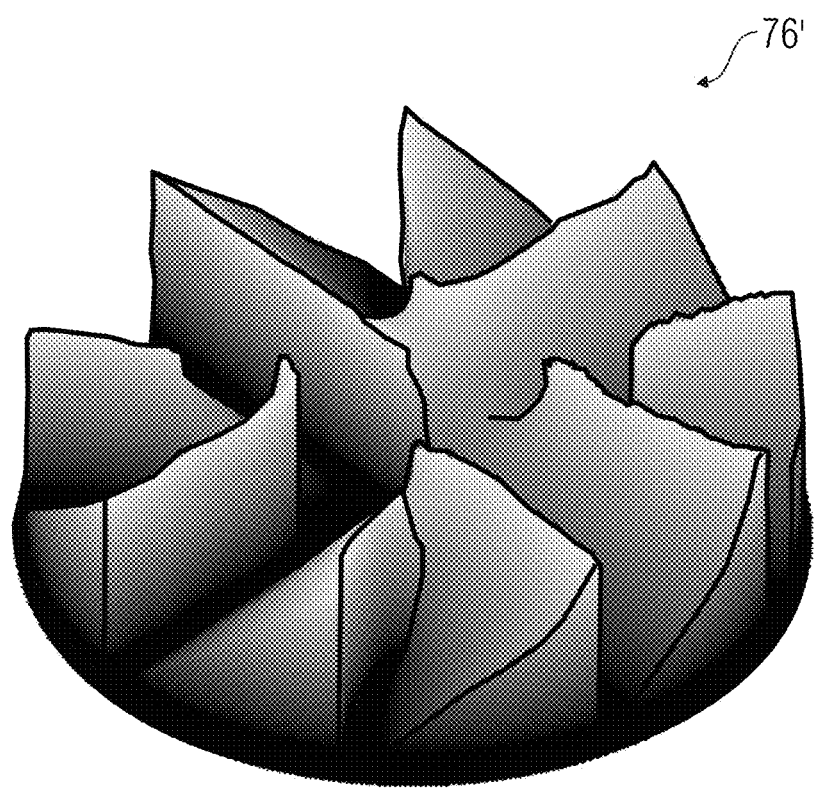
FIG. 2f is a schematic perspective view of the diffractive element of FIG. 2e.

FIG. 2f shows a schematic perspective view of the diffractive element 76'.

FIGS. 3a to 3d show a schematic top view of the multiple image 24 which may be obtained in a focal plane of the device 10. The multiple image 24 comprises a number of N=2 individual images 26a and 26b. This means that the optical means is configured to generate the multiple image 24 such that it comprises two individual images 26a and 26. Exemplarily, a point source is detected by the device 10 and transferred to the multiple image 24 by means of the optical means 22. The focal plane may be imaged onto the image sensor 14 by means of the projection optics 16. Individual features i of the imagings of the individual images 26a and 26b may be determined by the evaluating means 28 for determining the information relating to the aberration 12, like an intensity, position or shape of the outline of the imaging or the like.

Figure 3A:
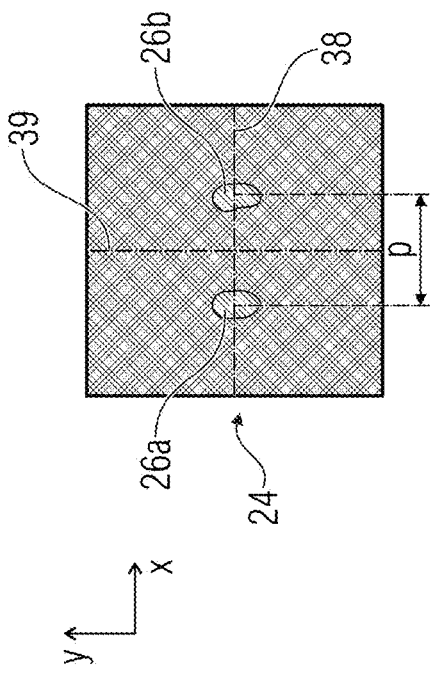
FIGS. 3a to 3d are schematic top views of a multiple image in accordance with an embodiment, comprising two sub-images which can be obtained in a focal plane of the device of FIG. 1.

FIG. 3a shows a schematic view of the multiple image 24 in a focal plane without any influence of the aberration 12, i.e. there is no or only a slight interfering impairment of the imaging. The sub-images 26a and 26b comprise a mutual distance p and are positioned at the same along a reference line 38.

Each of the sub-images 26a and 26b may comprise one or several features which may be determined and/or classified in the form of parameters. Determining and/or classifying the features i or parameters may be performed by the evaluating means 28. The parameters may, for example, be a relative intensity $I_i$ of the feature i, a rotational angle $\theta_i$ of the feature i or another image feature which can be evaluated by means of image processing. Since the corresponding image feature is present in each of the sub-images 26a and 26b, the evaluating means 28 can compare the parameters in the sub-images 26a and 26b. In addition, the evaluating means 28 may be configured to evaluate other parameters, like such which are related to the respective feature of the other sub-image. The distance p, a comparison of the intensity $I_i$ of the feature of the sub-images 26a and 26, a rotational angle of the individual sub-image and/or a relative broadening/blurring along a first image direction x and/or a second image direction y of the feature at the different image positions, i.e. in the different sub-images 26a and 26b of the multiple images 24, are examples of this. Some of the features may be compared to a set state, some of the features may be compared relative to one another. The individual images 26a and 26b may, for example, be arranged to be symmetrical to a symmetry axis 39.

Figure 3B:
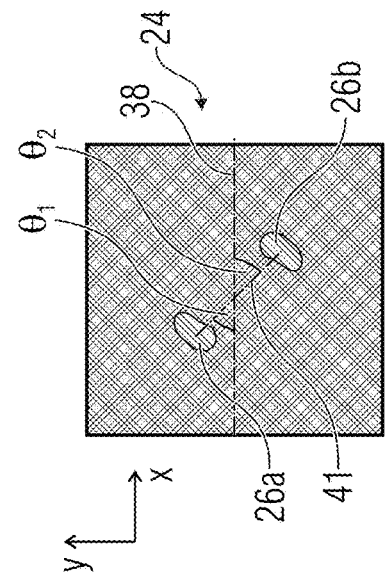

FIG. 3b shows a schematic view of the image distribution of the multiple image 24 in the focal plane where the point source, i.e. the feature, is rotated relative to the reference line 38 by an angle $\theta_1$. Alternatively or additionally, the feature or the sub-image 26b may be rotated relative to the reference line 38 by an angle $\theta_2$. The angles $\theta_1$ and $\theta_2$ may be equal or differ. The optical means may be configured to influence the imaging of the individual images 26a and 26b such that, when an aberration occurs, a connecting line 41 between the features of the individual images 26a and 26b is rotated compared to FIG. 3a by the angle $\theta_1$ or $\theta_2$.

Figure 3C:
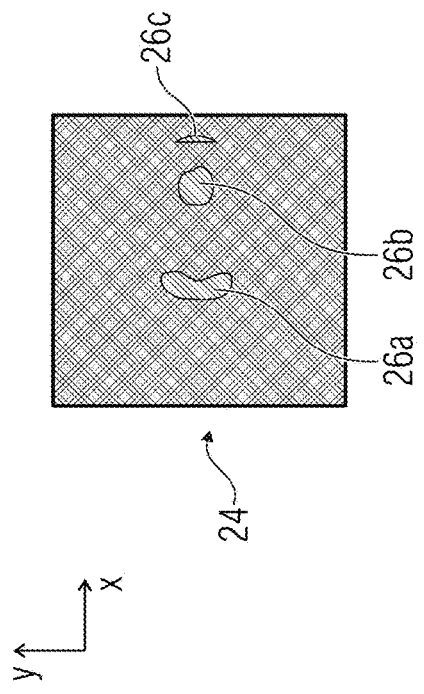

FIG. 3c shows a schematic view of the image distribution in the focal plane wherein the feature of the individual image 26a and the feature of the individual image 26b of the multiple image 24, when compared to the error-free illustration in FIG. 3a, exhibit a broadening/blurring along both image directions x and y. Thus, the feature of the individual image 26a is, for example, increased along the y direction and reduced in its extension at certain positions along the x direction. The feature of the individual image 26b, in contrast, is reduced in its extension along the y direction and/or increased in its extension along the x direction.

Figure 3D:
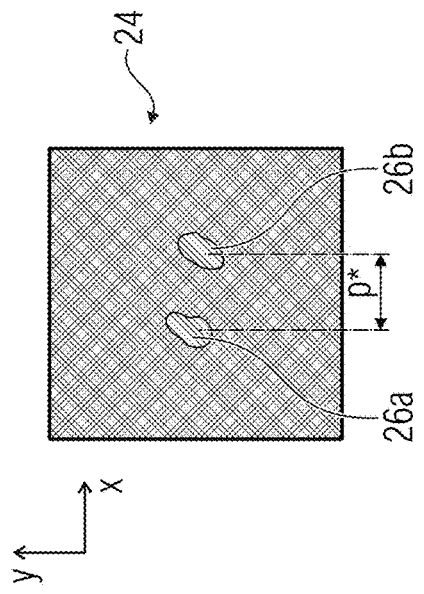

FIG. 3d shows a schematic view of the image distribution in the focal plane wherein the features of the individual images 26a and 26b comprise a changed distance p* to each other, wherein it is, for example, reduced compared to the distance p of FIG. 3a.

The changes of FIGS. 3b to 3d compared to FIG. 3a may each be caused by the optical means 22 performing a corresponding change of the imaging when an aberration 12 occurs. Here, the optical means may comprise M sub-regions, like regions 74 and/or 82. Due to the projection optics, each of these sub-regions allows a specific, i.e. associated sub-image of the multiple images. Since an aberration has different effects on the respective sub-regions, the sub-images are also shifted/distorted in different ways. In exemplary optical means implemented as a diffractive element and exemplarily formed with M=2 sub-regions, as is described in the context of FIGS. 2c and 2d, the result may be as is described, for example, in connection with FIGS. 3a to 3d. A defocusing aberration, for example, has the result that a sub-image 26a is distorted upwards and the other sub-image 26b is distorted downwards.

The result of this is that features 26a and 26b now exhibit an angle $\ominus$ relative to each other which is unequal to 0.

There may be a 1:1 relation between the number of N sub-regions of the optical means and the number of N sub-images, but there may also be different relations. The number N of the sub-images may match the number of peaks of the PSF. K may describe a number of side maximums (per order) in the cepstrum. The following relations may apply between the variables K, M and N: (1) Depending on the specific implementation/design of each of the M regions of the diffractive element, individual sub-images may overlap exactly so that the number N of separable/identifiable sub-images may be smaller than M. In principle, the following applies: M≥N, wherein N and M are each at least 2, meaning that a multiple image and several sub-regions are realized. (2) The sub-images may also be oriented to one another such that individual side maximums (of first order) of the cepstrum overlap exactly so that the number K are separable/identifiable side maximums (per order) may be smaller than N(N−1). In principle, the following applies: K≤N(N−1).

This means that the optical means 22 is configured to cause rotation of the features in accordance with FIG. 3b when a first type of aberration 12 occurs, and/or, in accordance with a second implementation, is configured to cause the change/blurring in accordance with FIG. 3c when the first type of aberration 12 occurs, and/or is configured in a third implementation to cause the changed distance p* when the first type of aberration 12 occurs. Alternatively or additionally, the optical means 22 may also be configured such that it causes rotation in accordance with FIG. 3b when the first type of aberration 12 occurs, broadening/blurring when the second type of aberration 12 occurs, and/or causes the changed distance p* when a third type of aberration 12 occurs, wherein the first, second and third type of aberration differ from one another. The case illustrated in FIG. 3b may, for example, be defocusing. The effect illustrated in FIG. 3c may, for example, be a coma. The case illustrated in FIG. 3d may, for example, be an astigmatism aberration.

As is illustrated in FIG. 3c, the optical means 22 may also be configured to form an additional image or image element 26c when an aberration occurs.

The evaluating means 28 is configured to determine the respective change. In some scenarios, however, the device 10 does not know which object is being detected at present so that the parameters in accordance with FIG. 3a are unknown, for example. Based on the configuration of the optical means 22, however, the distance p and/or a position of the reference line 38 along at least one of the image directions x and y may be known. This means that the evaluating means 28 may be configured to compare the features of the individual images 26a and 26b to one another, like a shape of the features of the individual images 26a and 26b in FIG. 3c. By means of the relative comparison of the two features among each other, the evaluating means 28 may be configured to draw conclusions as to the presence and/or type of aberration 12, and to its intensity.

FIGS. 4a to 4d show an illustration comparable to FIGS. 3a to 3d, wherein the optical means 22 is configured to generate the multiple image 24 such that each element is imaged with a number N=4 individual images 26a-d.

Figure 4A:
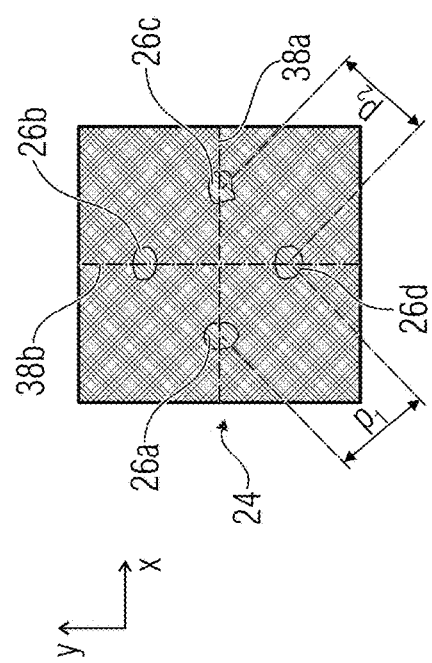
FIGS. 4a to 4d show illustrations comparable to FIGS. 3a to 3d, in accordance with an embodiment, wherein optical means is configured to generate the multiple image such that it includes a number of N=4 individual images.

FIG. 4a schematically shows a case of no aberration 12 present. The features of the individual images 26a to 26d are, for example, each arranged in pairs along a reference line 38a and 38b. Although the reference lines 38a and 38b are represented so as to be arranged perpendicularly to each other along the directions x and y, the reference lines 38a and 38b may also have an angle to each other differing from 90°. This is, for example, possible by means of an implementation or setting of the optical means 22. Each of the features of the individual images 26 to 26d has a distance to every other feature in the other sub-images, which is exemplarily illustrated for the distance $p^1$ between the features of the individual images 26a and 26d and the distance $p^2$ between the features of the individual images 26d and 26c. In the case of no error, the respective distances of neighboring objects may be the same or differ from one another based on the setting of the optical means 22.

Figure 4B:
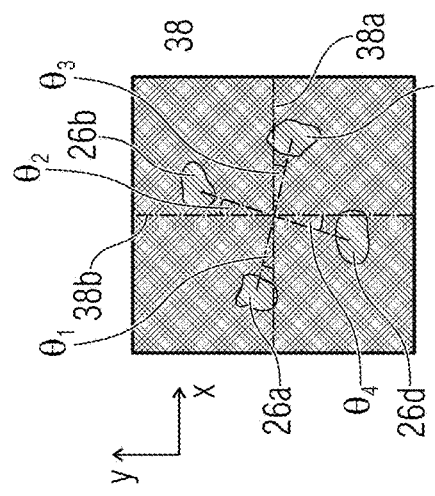

Comparable to FIG. 3b, FIG. 4b shows a rotation of the features of the individual images 26a to 26d by angles $\theta_1$ to $\theta_4$ which may each be the same or differ relative to at least one other angle, several other angles or relative to all other angles.

Figure 4C:
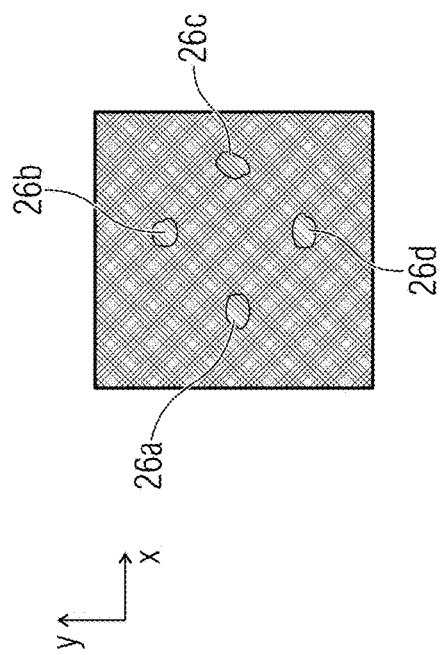

Comparable to FIG. 3c, FIG. 4c shows broadening/blurring of the features of the individual images 26a to 26d occurring. The respective change in shape may each be different in the individual images 26a to 26d.

Figure 4D:
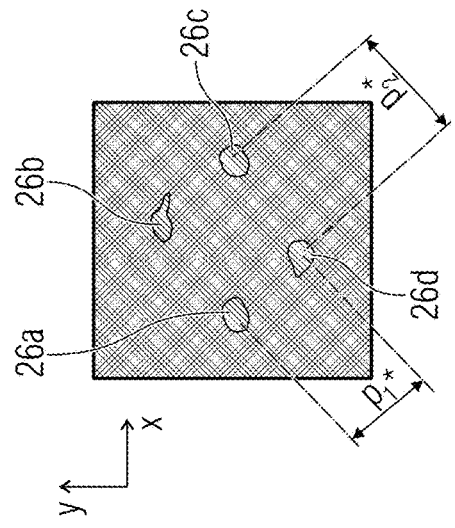

Comparable to FIG. 3d, FIG. 4d shows an effect where distances $d'_1$ and/or $d'_2$ are changed relative to the scenario in FIG. 4a, wherein the optical means 22 may be adjusted such that the respective change in distance $p_1/p^*_1$ and $p_2/p^*_2$ are reciprocal to one another or independent of one another.

It becomes obvious that a higher number of ways of comparing the features among one another can be obtained by a higher number of individual images 26a to 26d in the multiple image 24. This may result in an increased precision of determining the aberration, even when this may imply increased calculating complexity.

In other words, FIGS. 3a to 3d show a possible form of the point spread function (Fourier transform of the wavefront of a point source) after passing the optical means 22 for N=2 and, in FIGS. 4a-4d, for N=4. Here, the figures having the index "a" each show an imaging with no wavefront aberrations, FIGS. 3b and 4b each show imaging with defocusing wavefront aberrations, FIGS. 3c and 4c imaging with a coma wavefront aberration, and FIGS. 3d and 4d imaging with an astigmatism wavefront aberration. This imaging may be projected to the image plane of the image sensor 14 by means of an optical system, like the lens 16a in FIG. 6 or the lens 52b in FIG. 7.

Figure 5A:
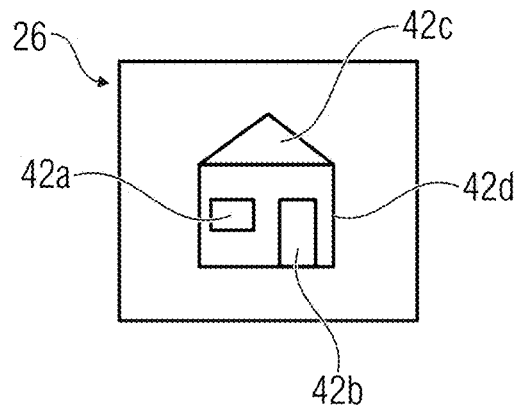
FIGS. 5a to 5e show schematic illustrations of a multiple image having N=4 individual images for an extensive object distribution in accordance with an embodiment.

FIGS. 5a-5e show a schematic illustration of an image distribution for an extensive objection distribution. Exemplarily, FIG. 5a schematically shows imaging of a house which exemplarily is to represent larger an extension compared to the point sources of FIGS. 3a-3d and 4a-4d. Alternatively, this may also be understood such that each of the individual images 26 of the multiple image 24 comprises a higher number of features compared to the point source of the figures discussed before. Thus, the schematic house exemplarily, but not finally, comprises features 42a-42d. The feature 42a may, for example, be a window, feature 42b may be a door, feature 42c may be a roof and feature 42d may be a side wall of the house. In principle, however, any further or different features in the object captured may be detected, for example, using edge detection or pattern recognition. Alternatively or additionally, the evaluating means 28 may perform an evaluation of a dimension of edges or areas enclosed by edges, like by means of imaging processing.

Figures 5B, 5C:
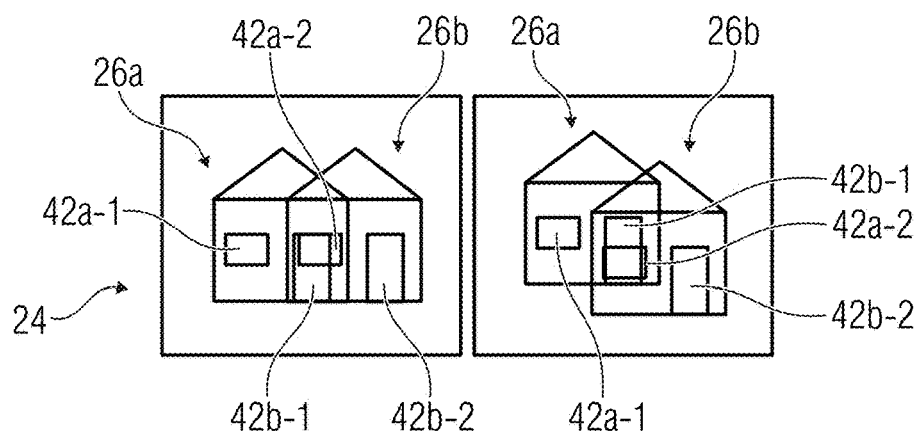

FIG. 5b shows an illustration comparable to FIG. 3a, wherein the optical means 22 is configured to generate the multiple image 24 such that it comprises two individual images 26a and 26b. The individual images 26a and 26b overlap partly. This means that the individual images 26a and 26b are shifted partly relative to each other. This means that the comparable features of the individual images 26a and 26b are also shifted relative to one another. The evaluating means 28 may be configured to evaluate a relative relation of different features relative to one another even when these overlap. Thus, feature 42b-1 of the first sub-image 26a may, for example, overlap feature 42a-2 of the second sub-image 26b. Due to the fact that the features comprise mutually different characteristics, i.e. parameters, the evaluating means 28 may be configured to differentiate between the features based on the parameters.

FIG. 5c shows a situation comparable to FIG. 3b, wherein the features of the individual images 26a and 26b are rotated relative to each other. If the evaluating means 28 knows about an error-free state, the evaluating means 28 may be configured to evaluate the relative change in position of mutually different features, like window and door, in different individual images 26a and 26b relative to one another. Alternatively or additionally, the evaluating means 28 may, when there are no such reference information, be configured to determine the relative positioning of equal or, at least, similar features, like when these are blurred.

Figures 5D, 5E:
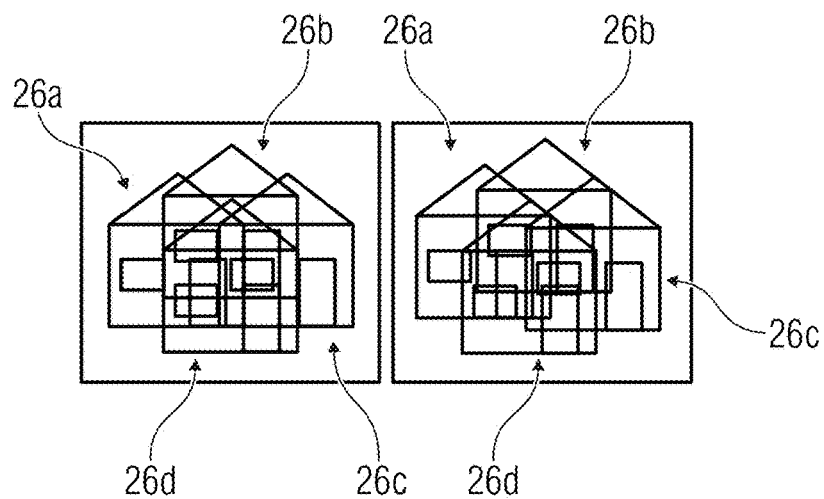

FIG. 5d shows a schematic view of an image distribution of the object distribution in accordance with FIG. 5a in a scenario which is comparable to FIG. 4a. Here, too, the entire object overlaps, which may also result in overlapping of different or equal features relative to one another.

FIG. 5e shows an illustration comparable to FIG. 4d, wherein the individual images 26a-26d are rotated relative to one another. Despite the overlapping of the features, the evaluating means 28 may be configured to determine the relative change in features relative to one another in order to determine information relating to the aberration based thereon.

In accordance with an embodiment, the optical means is configured to influence the optical projection such that a first type of aberration causes a first change in pattern in the multiple image 24, associated to the first type, and such that a second type of aberration 12 causes a second change in pattern in the multiple image, associated to the second type. The pattern may be determined completely or partly by the configuration of the optical means 22, like by the optical means 22 deciding along which directions and at which distance relative to one another the individual images and, thus, the features of the individual images are arranged in the focal plane. In addition, the pattern may be influenced by which number of sub-images is generated. FIGS. 3b, 4c, 5c and 5e, for example, each show defocusing, which means that the type of aberration corresponds to defocusing of the optical projection and the change in pattern corresponds to a rotation of the multiple image on the image sensor 12.

In other words, the optical means 22 may be configured to change/encode the amplitude and/or phase of the incoming wavefront such that the object distribution captured comprises double or multiple images with a number N, which means that the multiple image 24 is generated. This means that an object feature, like the window 42a of the house in FIG. 5a, is present in N≥2 image positions in the image detected by the image sensor 14. The object features may be mutually separate, but also overlap completely or partly, which means a considerable differentiation from the Shack-Hartmann approach where the images of the microlens array and, thus, all the object features are separate. When the optical means 22 comprises a diffractive element only the zero-th order of diffraction of the diffractive element can be used for generating the multiple image 24. Alternatively or additionally, higher orders of diffraction may also be used. In particular, using the zero-th order of diffraction of the diffractive element is a difference to the well-known phase diversity approach. The "phase diversity" approach may take two forms. In accordance with a first implementation, an adapted diffractive element may be used to generate several images of the object each in an order of diffraction unequal to zero and in an image plane, wherein the images are each focused in different ways. In accordance with a second implementation, using beams splitters, several images of the object can be generated in different image planes at different focus adjustments. In both cases, comparing image blurring allows drawing conclusions as to the wavefront aberration. However, this is numerically more complicated and less robust than the approach described here of comparing the position of the features of the multiple images.

The multi-division of the object feature obtained in this way may be described, among others, by the following parameters: a distance $p_{ij}$ of the image positions i and j of the feature (i, j=1, 2, . . . , N), a relative intensity $I_i$ of the feature at different image positions, a rotational angle $\theta_i$ of the feature at different image positions and/or a relative broadening/blurring ($R_i$, x, $r_{i,y}$) in the x and x-direction of the feature at the different image positions. With an ideal, i.e. flat, wavefront, which means that there is no aberration, these parameters are, for example, predetermined fixedly by the parameters and the geometry of the optical means, like a diffractive element. In order to increase the precision of determining the aberration, these may be calibrated by a measurement without or with only small aberrations.

An aberration of the wavefront exemplarily has the result that the certain parameters change in dependence on the type of aberration. Thus, a defocusing aberration may, for example, change directly the rotational angle $\theta_i$ and/or a coma aberration, like the intensities $I_i$, and/or an astigmatism aberration like the distances $p_{ij}$. Different aberrations may result in a more complex/coupled or combined change in the parameters, which can be influenced by the design of the optical means 22.

The following discussion relates to an advantages implementation of the evaluating means 28 for determining the different parameters. In accordance with embodiments, the evaluating means 28 is configured to determine, i.e. calculate same, a complex-valued cepstrum of the optical projection onto the image sensor 14 and to determine the information relating to the aberration from the cepstrum.

The term cepstrum is not defined consistently in literature. In general the cepstrum is to be understood such that an image distribution i(x, y) on the image sensor and along the image directions x and y is transformed to the frequency range. Here, the evaluating means 28 is, for example, configured to apply a first transform operation, like a Fourier-transform, a Laplace-transform or a different suitable transform for obtaining a frequency range representation.

In addition, the evaluating means 28 is configured to apply a distortion function to the frequency range representation obtained in this way, like a logarithm, in order to obtain a distorted frequency range representation. Based on the distortion function, what can be achieved is that low-value and high-value portions of the representation in the frequency range are weighted in different ways relative to one another. For example, the evaluating means 28 may be configured to apply a logarithm which attenuates low-value portions less compared to high-value portions, or even amplifies same. The evaluating means 28 may be configured to form the logarithm relative to any base, like 2, 3, 5 or 10, for example.

In addition the evaluating means 28 is configured to apply a second transform operation to the distorted frequency range representation. The second transform operation advantageously is inverse to the frequency range transform, like an inverse Fourier-transform or an inverse Laplace transform. In order to avoid or prevent negative values in the operation, the evaluating means 28 may additionally be configured to square individual portions or intermediate results or at least obtain a positive sign of these. Generally, the evaluating means 28 may be configured to calculate the cepstrum in accordance with the following rule:

$$C(x,y) = \text{Transformation2}(\text{Distortion}(\text{Transform1}))$$

wherein C(x, y) refers to the cepstrum relative to the image directions x and y.

In accordance with a specific embodiment, the evaluating means 28 may be configured to calculate the cepstrum based on the rule:

$$C(x,y) = |FT^{-1}\{\log_z|FT(i(x,y))|^2\}|^2$$

wherein the FT refers to the frequency range transform and $FT^{-1}$ is the inverse thereof, i(x, y) refers to the image distribution along the image directions x and y, and wherein $\log_z$ is the logarithm relative to the base z, like 2, 3, 5.

In accordance with an alternative embodiment, the evaluating means 28 may be configured to calculate the cepstrum based on the following rule:

$$C(x,y) = |FT^{-1}\{\log_{10}(|FT(i(x,y))|^2)\}|^2$$

Although the above examples describe a two-dimensional calculation of the cepstrum, a plurality of one-dimensional cepstra may also be determined and evaluated.

A so-called point spread function (PSF) of the optical projection may, for example, be derived from a result of the cepstrum operation. The cepstrum may comprise features, like extremum values or peaks of different orders, which the form of the PSF may be deduced from or which set the form of the PSF.

The cepstra C(x, y) of the image distribution in FIG. 5b and FIG. 5c are shown below (schematically).

Figure 5F:
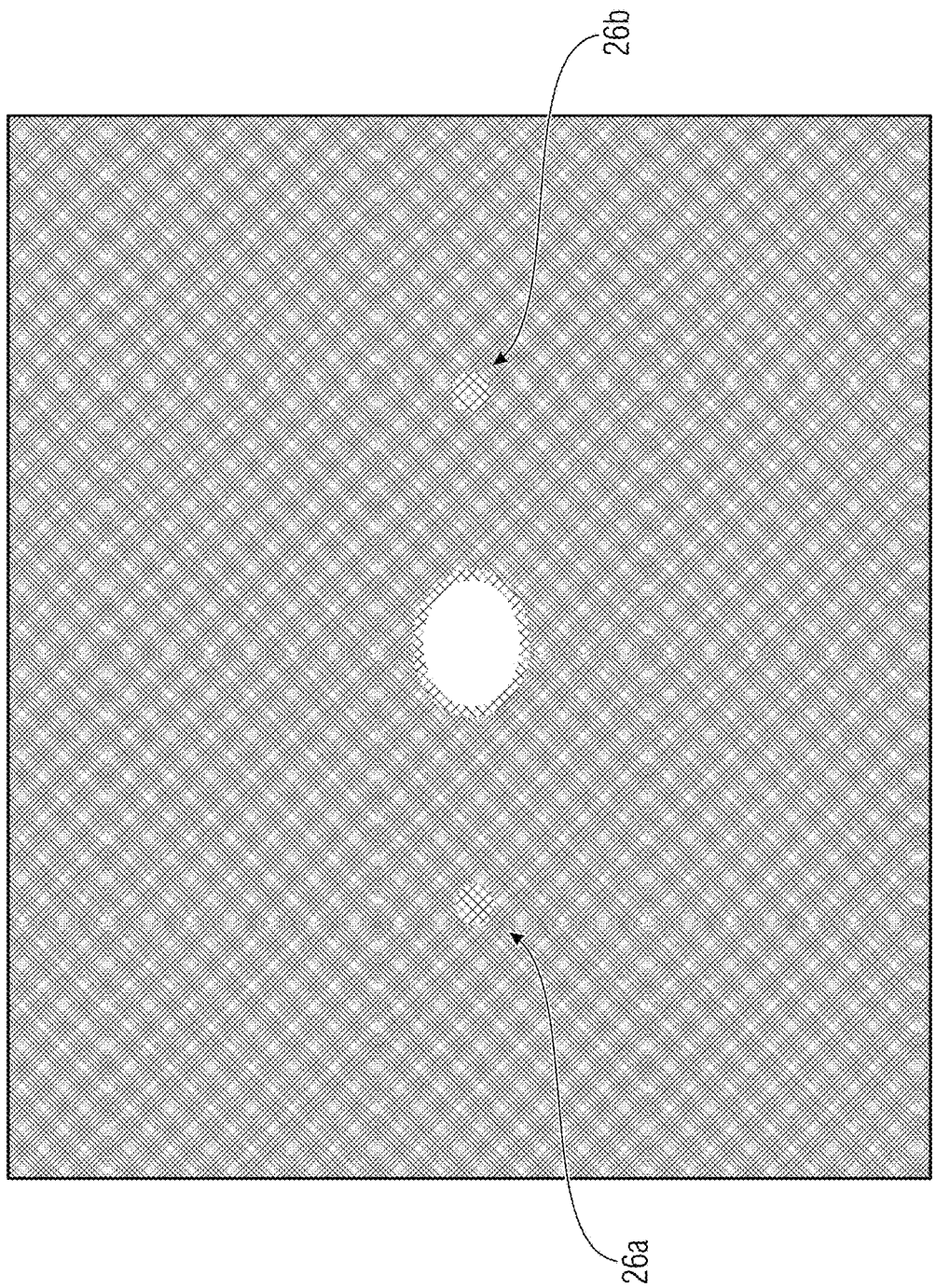
FIG. 5f shows a schematic illustration of a cepstrum which can be obtained based on the image distribution in FIG. 5b.

FIG. 5f shows a schematic graphical representation of a cepstrum which can be obtained based on the image distribution of FIG. 5b.

Figure 5G:
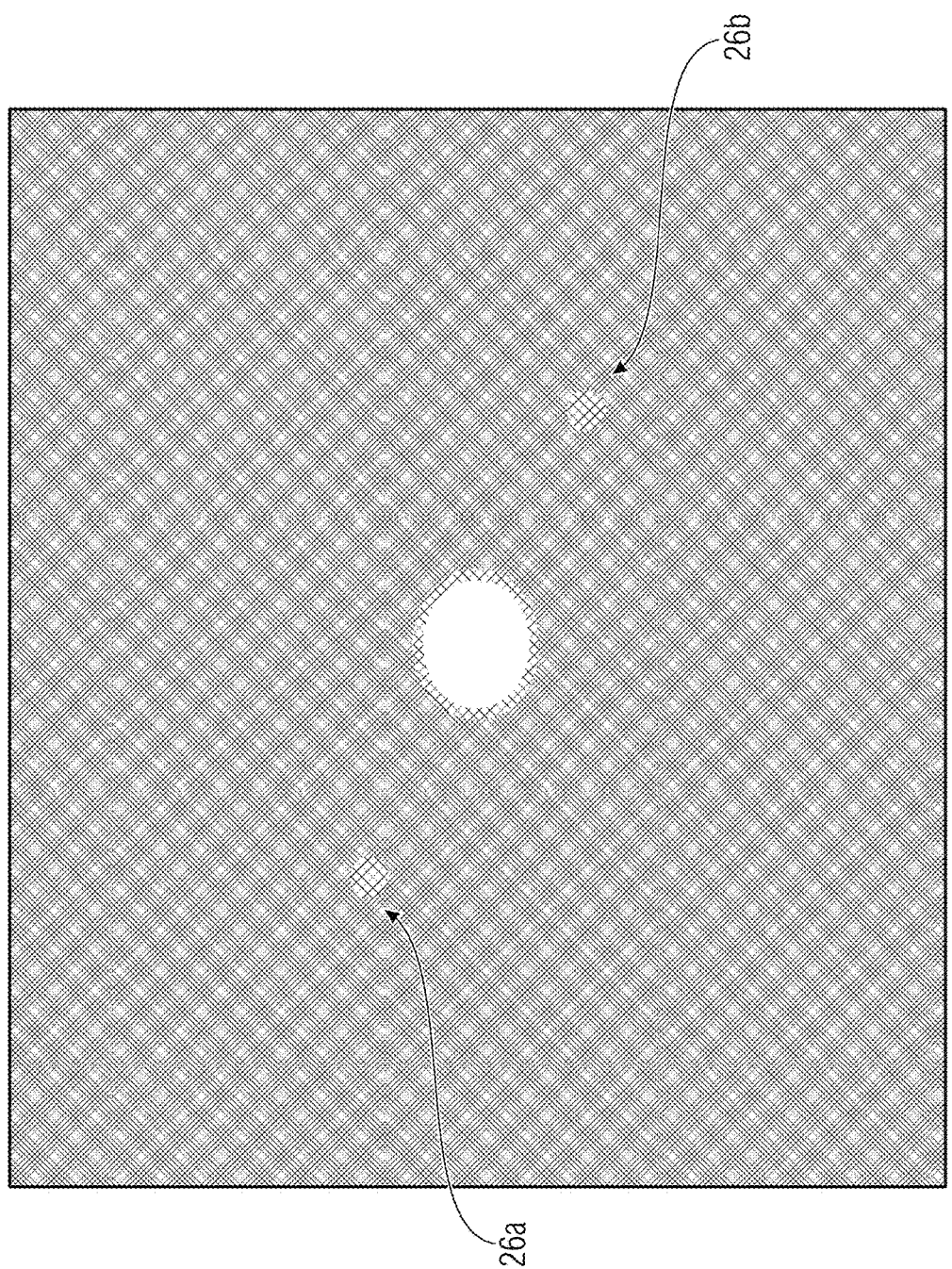
FIG. 5g shows a schematic illustration of a cepstrum which can be obtained based on the image distribution in FIG. 5c.

FIG. 5g shows a schematic graphical representation of a cepstrum which can be obtained based on the image distribution of FIG. 5c. It is to be kept in mind that the gray scale values are scaled logarithmically. Apart from a strong (zero order) central maximum, the cepstrum exhibits further side maximums of different, higher orders. In general, N(N−1) first order side maximums occur, and N(N−1) second order side maximums etc., which, in the present case, means 2(2−1)=2 side maximums per order.

The strong central maximum does not provide usable information for determining the aberration, or little information. However, the side maximums provide information using which the PSF and, in addition, the aberrations may be deduced from directly/quickly. Exemplarily, the rotational angle of the side maximums corresponds precisely to the rotation of the PSF peaks or the features in FIG. 5b and FIG. 5c. The distance of the first order side maximums, for example, corresponds precisely to double the distance of the PSF peaks or the features in FIG. 5b and FIG. 5c. By detecting the side maximums in C(x, y), the influence of an aberration on the objections features (rotation, distortion, . . . ) can be determined and, reversely, the aberration itself be measured in case the influence is known before (for example by means of calibration).

Using suitable image processing, the main maximum may be removed subsequently in order to be able to detect the side maximums better. Since the intensity of the side maximums decreases strongly with an increasing order, a robust detection of the side maximums may, for example, be possible only for first order side maximums. Thus, in FIG. 5f and FIG. 5g, only first order side maximums are, for example, identifiable, due to the low intensities of the side maximums of second and higher order.

The PSF may also be referred to as the impulse response of the optical system and may change in dependence on the aberration. The PSF may, for example, be used in a de-convolution operation from the contents of FIG. 3a to 3d or 4a to 4d in order to obtain a respective individual object, like the house of FIG. 5a. The PSF may comprise at least two, i.e. N≥2 local maximums. This may also be understood to mean that the cepstrum C(x, y), apart from a central mean maximum, may also comprise a number K≤N·(N−1) first order side maximums which may be identified by further image processing, like spot detection, by the evaluating means 28 at little numerical complexity. The side maximums can be identified the better, the more object features can be resolved in the image distribution i(x, y). The evaluating means 28 may be configured to determine the corresponding parameters $p'_{i,y}$, $I'_i$, $\theta'_i$ and/or relative broadening/blurring $r'_i$, x, $r'_{i,y}$ of these side maximums in the cepstrum C(x, y). These parameters determined may exhibit a direct proportional relation to the corresponding parameters in the image distribution i(x, y) so that evaluating the side maximums of the cepstrum has a result which is proportional to the change in the pattern in the image distribution.

By calculating the cepstrum, the wavefront aberration of the entire image distribution i(x, y), one and/or several sub-image regions $i_k(x, y)$ may be concluded, which means that these can be reconstructed. By evaluating several sub-regions $i_k(x, y)$, the aberration or several aberrations may thus also be measured in dependence on the object position, i.e. with a location resolution relative to the sub-regions. This means that, relating to the aberration 12, first information can be determined for a first sub-region, second information for a second sub-region, etc.

In other words, by means of a suitable mathematical description of the wavefront aberration, like developing to form suitable base functions, like Zernike modes, the influence of the amplitude of each base function or mode on these parameters can be determined. This may be done experimentally or theoretically. The calculation/determination of the influence may take place before the actual aberration measurement. A practical example is as follows: using the arrangement of element 16, 22, 14 and 28, in step 1, an advantageously known object (like a point source) is observed and, successively, different known aberrations 12

(like Zernike modes) are specifically introduced (by a deformable mirror), i.e. certain image errors are introduced. This may, for example, take place in a laboratory environment. These aberrations will then form the basis for the reference information. The respective influence on the parameters can be stored as an influence matrix. In Step 2, the arrangement is then applied in the actual application scenario in order to determine unknown aberrations (for example atmospheric turbulence) using the matrix determined before. Steps 1 and 2 may be performed in any order as long as the information on the aberrations are not required for measuring simultaneously, which, however, is used in an active optical system for wavefront correction. When the influence is known, the amplitude of the individual base functions and, thus, the form of the wavefront aberration may conversely be concluded by measuring the parameters. These information may be stored in the form of an influence matrix and/or inverse influence matrix in the evaluating means 28 or be stored to be accessible in a memory. The parameters in the image distribution i(x, y) may be measured as follows: a single electronically captured image distribution i(x, y) may be used and be processed by, for example, the evaluating means 28, like a PC. Thus, the complex cepstrum C(x, y) of the entire image distribution i(x, y) captured or of one or several sub-regions $i_k$(x, y) is calculated. This calculation may be performed very quickly by means of (FFT=Fast Fourier Transform) algorithms, which means that only low calculating times are used.

With regard to PSF, this means that, by changing the cepstrum which exemplarily serves as the basis for the PSF, the optical means may be configured such that the PSF is subjected to different changes for different times of aberration. Different influences on the PSF may consequently be associated to different types of aberration.

In other words, the extensive object distribution captured in this way may comprise several features. A "feature" here may, for example, be the window which, due to the influence of the diffractive element, occurs several times in the image distribution i(x, y). FIG. 5a exemplarily shows the extensive object distribution, FIG. 5b the element variation N=2 with no aberration, FIG. 5c the element variation N=2 with a defocusing aberration, FIG. 5d the element variation N=4 with no aberration, and FIG. 5e the element variation N=4 with a defocusing aberration.

Figure 6:
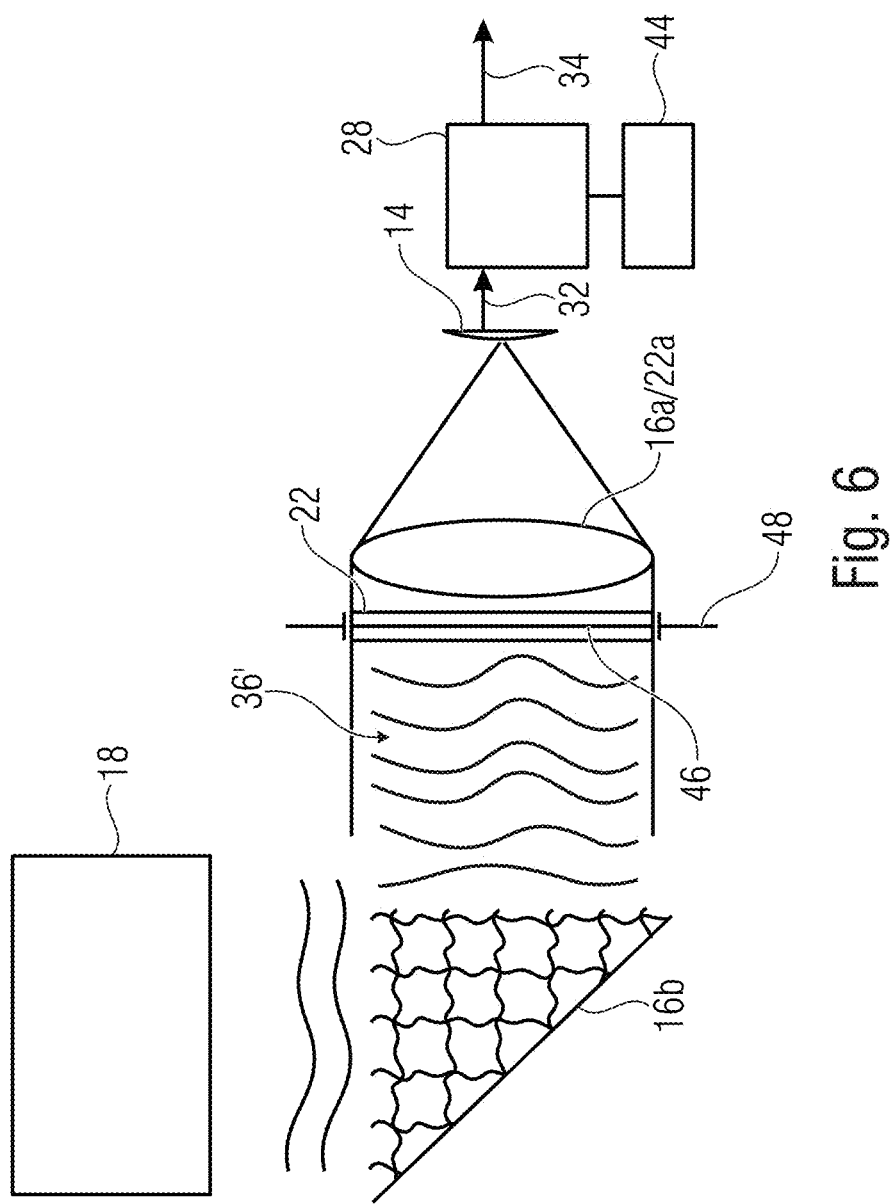
FIG. 6 is a schematic block circuit diagram of a device for measuring an aberration in accordance with an embodiment, wherein the optical means is arranged on a side of a lens facing away from the image sensor.

FIG. 6 shows a schematic block circuit diagram of a device 50 for measuring an aberration. Compared to the device 10, the optical means 22 is arranged on a side of a lens 16a facing away from the image sensor 14. The lens 16a and a mirror 16b are part of the projection optics. This means that the optical means 22 is arranged between two elements 16a and 16b of the projection optics. The optical means 22 may be connected directly to the imaging lens 16a. When the optical means 22 is, for example, a diffractive optical element or when the optical means 22 comprises a diffractive optical element, it may be arranged on a surface of the lens 16a. This may also be implemented such that the imaging lens 16a and a diffractive optical element are part of the optical means 22, whereas the mirror 16b is part of the projection optics 16. The device 50 may also comprise further imaging elements, like lenses or mirrors, which may be part of the projection optics 16 or the optical means 22.

The device 50 may comprise a memory 44 in which reference information relating to the aberration are stored. The reference information may, for example, be stored in the form of influence information describing an influence of a respective aberration on a pattern projected onto the image sensor 14. Alternatively or additionally, the memory 44 may comprise inverse influence information providing information on which changes are to be made in the optical system, i.e. device 50 or another system detecting the object region 18 in order to reduce the influence of the aberration at least partly. The evaluating means 28 may be configured to determine a change in a pattern of the multiple image and to determine, using the reference information and the change in pattern determined, the information relating to the aberration. This means that the specific arrangement and/or deformation of the individual images of the multiple image can be compared to the information in the memory 44 in order to determine the information relating to the aberration.

The evaluating means 28 may be configured to perform the aberration correction numerically in order to obtain a corrected image distribution. This means that the evaluating means 28 may be configured to generate or provide a reconstructed image of the object. Here, the evaluating means 28 may use the output signal 34. Alternatively or additionally, the evaluating means may be configured to determine PSF parameters and to numerically de-convolute the multiple image captured using the PSF parameters and thus obtain a decoded (single) image of reduced aberration influence.

In addition, FIG. 6 illustrates an aperture plane 46 imaged by the lens 16a or 22a, which is influenced at least partly by an aperture 48 of the device 50. Thus, the lens 16a or 22a may be associated to the imaging optics 16 or the optical means 22. The aperture 48 may, for example, be a variable or fixed orifice restricting the visual range of the device 50.

Figure 7:
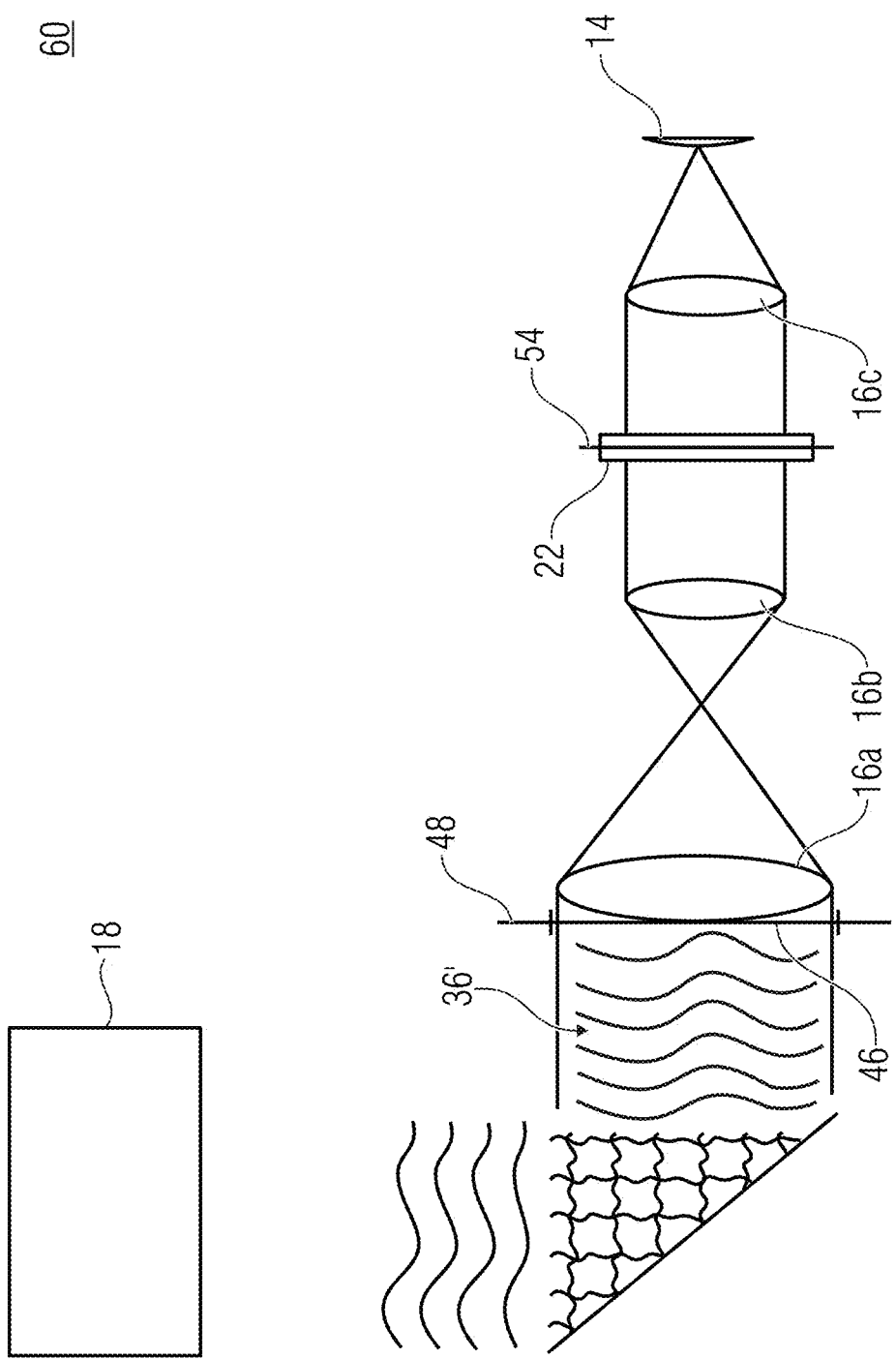
FIG. 7 is a schematic block circuit diagram of another device for determining an aberration in accordance with an embodiment.

FIG. 7 shows a schematic block circuit diagram of a device 60 for determining an aberration. The device 60 is configured to image the aperture plane 46 by means of a lens 52a to a plane 54 from where a lens 52b is implemented to project the plane 54 onto the image sensor 14. The optical means 22 may be arranged in the plane 54, which means that the aperture plane 46 may be imaged to the plane 54 of the optical means 22. When comparing the devices 50 and 60, when starting from an object/target distribution, the wavefront 36' may impinge on the imaging/illumination system comprising the lens 16a and the aperture 48. Here, the wavefront 36' may comprise aberrations. In accordance with the arrangement of the device 50, the optical means, like the diffractive element, may be integrated directly in the aperture plane of the observation-illumination system, i.e. of the lens 16a. In accordance with the arrangement of the device 60, the projection optics may comprise several lenses 16a to 16c. The aperture plane 46 may be imaged by the optical system 52a to the plane 54 which the diffractive element is integrated in. Expressed in a simplified manner, a lens 16a may perform focusing. A lens 16b may perform collimation and a lens 16c may perform subsequent focusing. This may also be understood such that a pupil region between the lenses 16b and 16c may be extended by the collimated optical path there between, thereby making positioning of the optical means 22 in the pupil region easier. In other words, the pupil region between the lenses 16b and 16c is basically unchanged.

In both variations of implementing the devices 50 and 60, the optical means 22 is, for example, implemented in a transmission configuration. In accordance with further embodiments, the diffractive element or optical means 22 may also exhibit a reflective characteristic, which means that the image sensor 14 and the aperture plane 46 are arranged on the same side of the optical means 22.

It is of advantage here that a distortion or influencing of the imaging by the diffractive element or optical means 22 is small, so that a penetration depth in a reflecting element may be implemented to be smaller than through a transmitting element, i.e. an influence of the imaging by the material can be smaller.

The optical means 22 may, for example, be a separate/independent module and/or a structure which is integrated directly in or on an imaging element, like a lens, a mirror or the like.

Figure 8:
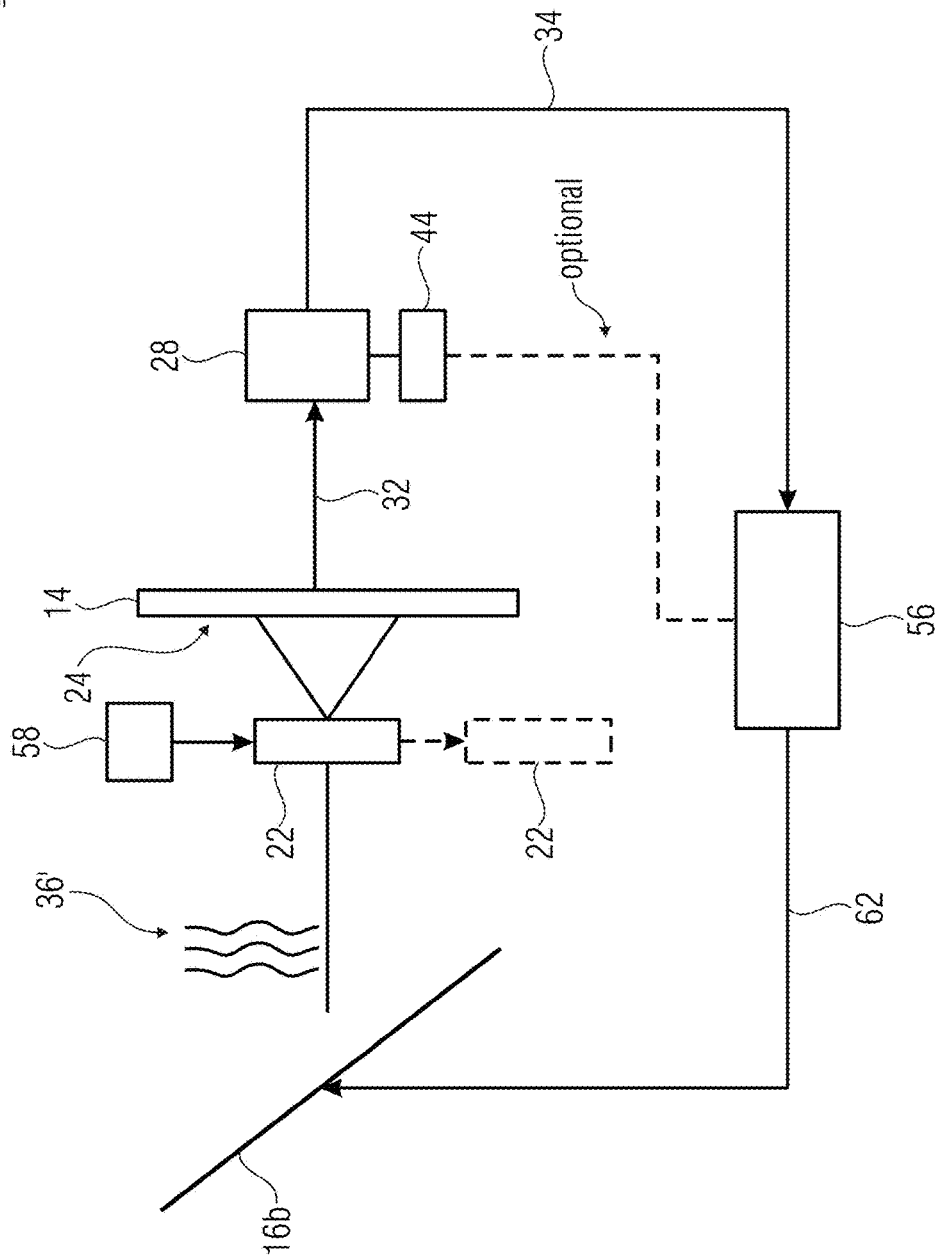
FIG. 8 is a schematic block circuit diagram of an imaging system in accordance with an embodiment comprising a device for measuring an aberration.

FIG. 8 shows a schematic block circuit diagram of an imaging system 70 comprising a device for measuring an aberration. The device for measuring the aberration comprises projection optics 16b in the form of a redirecting mirror. When compared to the device 10, the same may be implemented as an alternative to the projection optics 16 implemented as a lens. Optionally, the imaging systems 70 may also comprise further optical elements as part of the projection optics.

The imaging system 70 comprises adjusting means configured to adjust the projection optics using the information relating to the aberration such that an influence of the aberration on the projection onto the image sensor 14 is reduced compared to a state detected by the device for detecting the aberration. Here, the adjusting means 56 may, for example, receive the signal 34 from the evaluating means 28. Exemplarily, the device for measuring the aberration may detect a state of the imaging system 70 influenced by the aberration 12, like using the reference information stored in the memory 44.

The adjusting means 56 may be configured to change at least one optical characteristic of the projection optics in order to reduce the influence of the aberration 12. Here, the adjusting means 56 may provide an electrical or thermal or optical drive signal 66, for example in order to change a position along/perpendicular to the optical path, a degree of reflection, a degree of transmission, surface curvature or the like of the projection optics. Alternatively or additionally, any characteristic and/or the entire surface may be changed. Exemplarily, a deformable mirror having laterally distributed actuators may be used, thereby locally varying the surface curvature. Alternatively or additionally, the local phase offset of the optics, for example of a "spatial light modulator", may be varied.

A measure of evaluation for the improvement of the imaging may, for example, be provided by the Strehl ratio or the Strehl number S. When the projection optics comprise lenses, the adjusting means 56 may be configured to change a position, a focal length or another characteristic of the lens in order to reduce the influence of the aberration 12.

Expressed in a simplified manner, the imaging system 70 may be configured to determine the influence of the aberration in a first step, like in the form of correction capturing. In a subsequent, second step, the imaging system 70 may be configured to project the object region onto the image sensor 14 again and at a reduced influence of the aberration 12. Here, the imaging system 70 may comprise control means 58 configured to control the optical means 22.

Controlling may take place such that the optical means 22, in the first time interval during which the correction capturing is detected is arranged in order to influence the optical projection onto the image sensor 14 such that the multiple image forms on the image sensor 14. In a second time interval during which the object region is to be projected onto the image sensor 14 at reduced influence of the aberration 12, the control means 58 may be configured to influence the optical means 22 such that the optical projection onto the image sensor 14 is influenced by the optical means 22 at least to a lesser extent. Here, the control means 58 may, for example, be configured to move the optical means 22 from an optical path between the object region and the image sensor 14, as is indicated by the broken lines. Exemplarily, the control means 58 may comprise an actuator (control element) or drive same, wherein the actuator is configured to move the optical means 22 from the optical path. Alternatively or additionally, the control means 58 may be configured to influence at least one optical characteristic of the optical means 22. Exemplarily, the control means 58 may be configured to drive the optical means 22 by means of electrical or thermal actuator elements so that the same comprises a degree of reflection increased compared to the correctional capturing and/or does not generate a multiple image.

Optionally, the adjusting means 56 may be connected to the memory 44 to derive the drive signal 62 from the reference information, i.e. provide information on using which measures of influencing the optical projection optics 16b the influence of the aberration can be reduced.

In accordance with an advantageous further development, the adjusting means 56 may be configured to adjust the projection optics in a spatially resolved manner, like by different influencing or only partly influencing at selective locations of the projection optics. Here, a deformable mirror may, for example, be deformed in a location-selection manner and/or a transmission characteristic be influenced in a location-selective manner. This is of advantage, since the influence of the aberration can be reduced in a location-selective manner and a globally high imaging quality can be achieved in this way. Aberrations may, for example, result in a change in the direction of propagation of the wavefront 36 and consequently also to an offset of the entire image in the image plane, resulting in certain sub-regions to no longer be detected by the detector 14, for example. Using a tip/tilt mirror, the direction of propagation of the wavefront 36 may be changed by tilting the mirror relative to the direction of incidence of the wavefront 36' by means of active control elements. Thus, the absolute position of the (multiple) image on the detector 14 may be adjusted and this effect be counteracted.

Figure 9:
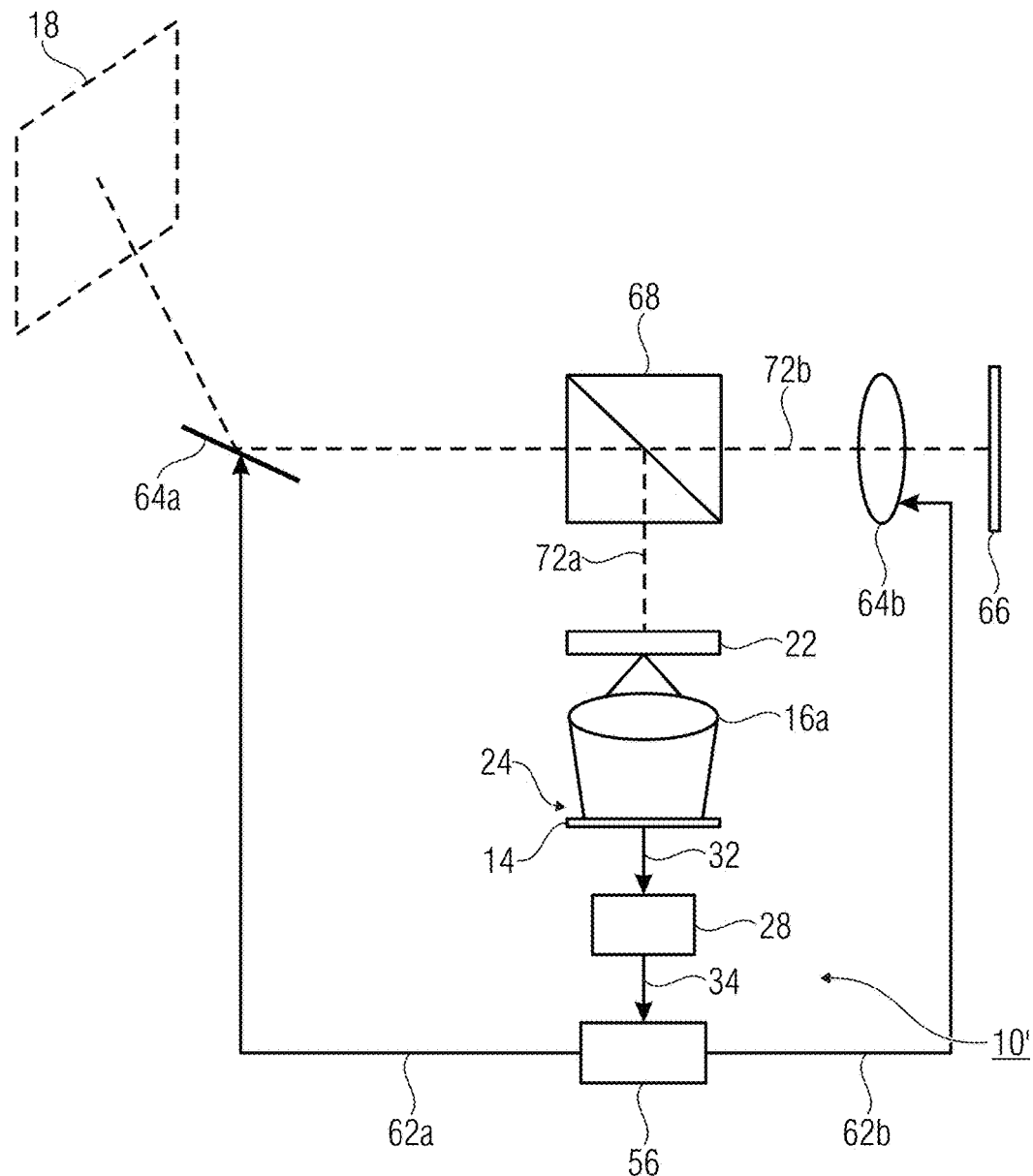
FIG. 9 is a schematic block circuit diagram of another imaging system in accordance with an embodiment.

FIG. 9 shows a schematic block circuit diagram of an imaging system 80 comprising a device 10' for measuring the aberration. The device 10' may basically exhibit an identical structure to the device 10. However, the optical means 22 may, for example, be arranged on a side of the projection optics 16a facing away from the image sensor 14. Alternatively, the device 10 may also be arranged. Alternatively, the imaging system 80 may also comprise the device 50 or 60. In addition, the imaging system 80 comprises further projection optics comprising a redirection mirror 64a and a lens 64b, wherein parts of the further projection optics, like the redirection mirror 64a, may also be associated to the projection optics 16. The redirection mirror 64a may, for example, be the redirection mirror 16b of the imaging system 70. The lens 64b may be configured to project the optical path received from the object region 18 onto another image sensor 66.

The imaging system 80 may comprise a beam-splitting element 68 configured to split the optical path received from the object region 18 such that a first portion 72a is directed towards the device 10' and another portion 72b towards the image sensor 66. The beam-splitting element 68 is, for example, configured to provide the first portion 72a and the second portion 72b such that the projection onto the image sensors 14 and 66 has the same optical origin, i.e. the object region 18. Expressed in a simplified manner, this means that the object region 18 is imaged both onto the image sensor 14 as a multiple image 24 and, in an advantageously corrected form, onto the image sensor 66. The beam-splitting element may, for example, be a beam-splitting cube or a prism.

The imaging system 80 comprises adjusting means 56 configured to adjust the redirection mirror 64a based on a first drive signal 62a and the lens 64b based on a second drive signal 62b such that an influence of the aberration on the projection onto the image sensor 66 is reduced when compared to a state as is detected by the device 10'. Alternatively, only the mirror 64a or the lens 64b may be arranged. Alternatively, the adjusting means 56 may be configured to adjust only one of the elements of the mirror 64a and the lens 64b. Alternatively, the imaging optics may also comprise further elements which may optionally be influenced relative to their optical characteristic by the adjusting means 56. This means that the adjusting means 56 may be configured to adjust only one of or a higher number of optical elements of the projection optics of the imaging system 80.

Based on knowing which change in the pattern in the multiple image 24 is caused by which aberration, the adjusting means 56 can reduce or keep small the influence of the aberration on the projection onto the image sensor 66, continuously and, may be, in real time, i.e. between two capturings of the imaging system 80 onto the image sensor 66. Despite the increased hardware complexity when referring to the imaging system 70, it can be achieved that the recordings onto the image sensor 14 and the image sensor 66 can be detected at a small temporal offset to each other, to a degree to which a calculating time for calculating the influence of the aberration 12 and for driving the optical elements is entailed.

In principle, the certain effects of the aberration 12 can be used for the next capturing in order to improve the same when compared to the influenced state, or post processing of the current capturing may take place, like considering which imaging errors have been provoked on the image sensor.

Expressed in a simplified manner, the information relating to the aberration may be obtained from a device 10, 10', 50 or 60 and be used such that the influence of the aberration is reduced.

Although, in the embodiments described before, the evaluating means 28, the adjusting means 56 and the control means 58 are represented to be separate elements, at least a first element and a second element thereof may be implemented to form common means, like in the form of a microprocessor, an FPGA (Field Programmable Gate Array), CPU or the like.

Figure 10:
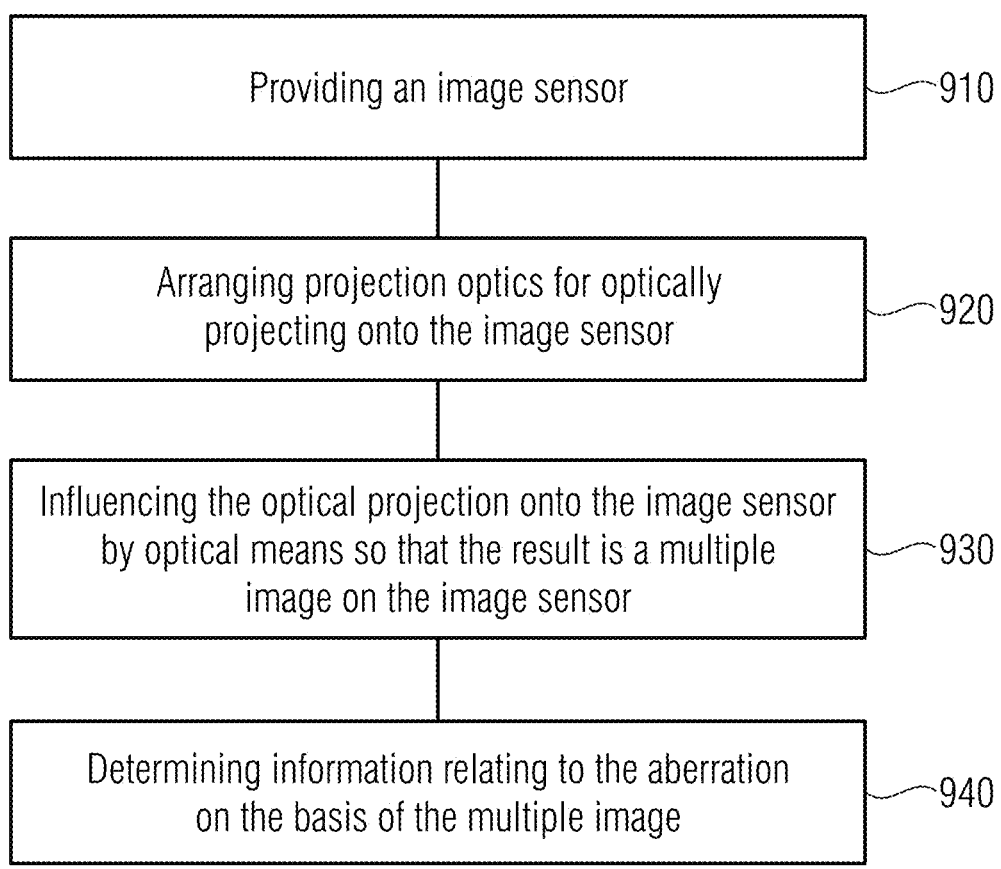
FIG. 10 shows a schematic flow chart of a method for measuring an aberration in accordance with an embodiment.

FIG. 10 shows a schematic flow chart of a method 900 for measuring an aberration. In step 910, providing an image sensor, like the image sensor 14, takes place. In step 920, arranging projection optics for an optical projection onto the image sensor is done. This may, for example, be the projection optics 16. In step 930, influencing the optical projection onto the image sensor by optical means such that a multiple image is formed on the image sensor takes place. In step 940, determining information relating to the aberration on the basis of the multiple image takes place.

The embodiments described before describe an advantageous method for determining an aberration and a way of reducing its influence in an imaging system.

In other words, the wavefront aberrations of the atmosphere and/or of an optical system can be measured in order to finally improve the imaging/illuminating quality of the optical system using active optical elements, like increasing the Strehl ratio. The advantages are, among others, that no active illumination of the object or target is required. In addition, an extensive target or object, in particular an extensive object range or an extensive scene, can be used, i.e. no point source is required. Only an image sensor is used for evaluating the image sensor. In addition, only one image capturing per measurement is used for providing the information relating to the aberration. Due to high object scanning, since no reduction of the image distribution is necessary in addition to the illumination/imaging system, like the projection optics 16, the object features can be imaged at high a resolution, resulting in a robust measurement of the aberration. The embodiments described above additionally allow a numerically efficient measurement, since no iterative optimization steps are required and fast algorithms, like FFT algorithms, may be used. The aberrations can be determined in a spatially resolved manner for different object regions.

As an alternative to the embodiments described before, the optical means 22 may comprise one or several diffractive elements. The diffractive elements may be positioned at several mutually different positions in the optical path. This means that impressing optical characteristics on the multiple image may also take place by several diffractive elements. Instead of diffractive elements, different, may be more unsophisticated optical elements may also be arranged in order to generate the multiple image. An easy arrangement may be based on at least two, i.e. M≥2 prisms which comprise a total of N different angles, wherein M≥N applies. Thus, N sub-images of the multiple image having similar characteristics can be generated, wherein the example of the prism discussed already, in combination with a flat glass area, may be a special case. Instead of prisms, M mirrors of different tilting may also be used. Exemplarily, using a prism in combination with a flat glass area, at least similar effects can be generated. Although embodiments described above are described such that the evaluating means 28 is configured to calculate a cepstrum, in accordance with alternative embodiments, autocorrelation which may result in side maximums which may be difficult to identify, but allow an easier calculating rule can also be calculated.

In the phase diversity approach, each sub-image is generated by the entire wavefront, whereas in embodiments at least two of the N sub-images are generated by respective different regions of the wavefront. In the known concept described in U.S. Pat. No. 8,517,535 B2, the sub-images are generated by different diffraction orders of the diffractive element. In a second realization of the phase diversity approach described in U.S. Pat. No. 7,531,774 B2, the sub-images in different image planes are generated by a beam splitter. In accordance with embodiments described here, the sub-images, in contrast, are obtained by dividing the wavefront in combination with a change in the respective direction of propagation.

Above embodiments illustrate that, in contrast to the phase diversity approach where the influence of an aberration on different focus adjustments or image planes is analyzed in order to measure the aberration, the influence of an aberration on different sub-regions of the optical means is analyzed in accordance with embodiment described here. Thus, all the sub-regions may comprise the same focusing. In addition, making reference to FIGS. 3 and 4, in the phase diversity approach, only the shape/size of blurring changes when an aberration occurs, whereas in embodiments additionally the position of the sub-images/features changes, thereby making measurement of the aberration more robust and quicker. This means that the optical means is configured to generate the multiple image such that a position of a sub-image in the multiple image is influenced by the aberration.

A known classical Shack-Hartmann sensor uses only a micro lens array, but not a combination of projection optics and optical means. In a further implementation which is described, for example, in EP 1 983 318 A1, in contrast, the micro lens array is used in combination with projection optics. However, in this embodiment, no multiple image of the object distribution is generated, since every object point is observed by precisely one micro lens and is thus present only once on the image sensor.

Embodiments described before may, for example, be employed in high-resolution earth-bound optical space observation. In particular, this may be observing the sun. Alternatively or additionally, embodiments described here may be employed for earth observation by satellites, planes, drones or the like. Further applications are in optical free-space communications, optical material processing, like laser or high-power laser, retina examination, refractometers, i.e. determining the aberration of the eye, generally optical observations using binoculars and/or night-vision glasses, or adjusting and evaluating the quality of optical systems.

Although some aspects have been described in connection with a device, it is to be understood that these aspects also represent a description of the corresponding method so that a block or element of a device is to be understood to be also a corresponding method step or feature of a method step. In analogy, aspects having been described in connection with or as a method step also represent a description of a corresponding block or detail or feature of a corresponding device.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

The invention claimed is:

1. A device for measuring an aberration, comprising:
   an image sensor;
   projection optics for optically projecting onto the image sensor;
   an optical unit for influencing the optical projection onto the image sensor so that the result on the image sensor is a multiple image of a plurality of sub-images, wherein the optical unit comprise at least one region per sub-image, wherein the regions influence different lateral portions of a wavefront incident on the projection optics in different ways;
   wherein different regions of the optical unit are adapted to deflect only a respective part of the wavefront to a different direction when generating the multiple image, wherein the focus is the same for the entire wavefront;
   an evaluator configured to determine information relating to the aberration on the basis of the multiple image;
   wherein the optical unit is arranged in an aperture plane of the device or in a plane into which the aperture plane is imaged;
   wherein the plurality of sub-images overlap partly, wherein the evaluator is configured to evaluate a relative change in a position of the at least one feature in the plurality of sub-images to determine the information relating to the aberration.

2. The device in accordance with claim 1, wherein the evaluator is configured to evaluate the multiple image using pattern recognition in order to determine the information relating to the aberration based on the pattern recognition.

3. The device in accordance with claim 2, wherein the optical unit is configured to influence the optical projection such that a first type of aberration causes a first change in pattern in the multiple image, associated to the first type, and that a second type of aberration causes a second change in pattern in the multiple image, associated to the second type.

4. The device in accordance with claim 3, wherein the optical unit is configured such that rotation of the multiple image on the image sensor takes place with defocusing of the optical projection.

5. The device in accordance with claim 1, wherein the regions are arranged in a pupil region of the projection optics.

6. The device in accordance with claim 1, wherein the optical unit is configured to generate the multiple image such that a position of a sub-image in the multiple image is influenced by the aberration.

7. The device in accordance with claim 1, wherein the evaluator is configured to determine first information relating to the aberration for at least a first sub-region and second information relating to the aberration for at least a second sub-region of the multiple image.

8. The device in accordance with claim 1, wherein the optical unit is configured such that a PSF of the optical projection comprises at least two local maximums.

9. The device in accordance with claim 8, wherein the optical unit is configured such that the PSF is subjected to different changes for different types of aberration.

10. The device in accordance with claim 1, wherein the information relating to the aberration relate to at least one of defocusing of the optical projection, coma aberration of the optical projection and astigmatism of the optical projection.

11. The device in accordance with claim 1, wherein the evaluator is configured to calculate a cepstrum of the optical projection and to determine the information relating to the aberration from the cepstrum.

12. The device in accordance with claim 11, wherein the evaluator is configured to determine parameters of side maximums of the cepstrum and to determine the information relating to the aberration based on the parameters.

13. The device in accordance with claim 1, wherein the evaluator is configured to evaluate at least one of:
   a distance between a position of a feature in a first image of the multiple image and a position of the feature in a second image of the multiple image;
   a difference in intensity in the feature in the first image and in the second image;
   a rotational angle, by which the feature in the first and/or second image is rotated compared to a position with no aberration present; and
   a relative distortion of the feature in the first and the second image.

14. The device in accordance with claim 1, comprising a memory in which reference information relating to the aberration are stored,
   wherein the evaluator is configured to determine a change in pattern of the multiple image and to determine the information relating to the aberration using the reference information and the change determined.

15. The device in accordance with claim 1, wherein the optical unit comprises a diffractive optical element.

16. The device in accordance with claim 15, wherein the optical unit comprises an imaging lens for projecting the optical projection onto the image sensor, and wherein the diffractive optical element is arranged at the imaging lens.

17. The device in accordance with claim 1, wherein the multiple image comprises a plurality of sub-images, and wherein common focusing is a focus of the projection optics effective for each of the plurality of sub-images.

18. An imaging system comprising:
a device in accordance with claim 1;
an adjuster configured to adjust the projection optics using the information relating to the aberration such that an influence of the aberration on the projection onto the image sensor is reduced compared to a state detected by the device;
a controller for controlling the optical unit such that the optical unit is arranged in a first time interval in order to influence the optical projection onto the image sensor such the result is the multiple on the image sensor; and such that the optical unit is arranged in a second time interval in order to influence the optical projection onto the image sensor at least to an extent smaller compared to the first time interval.

19. The imaging system in accordance with claim 18, wherein the controller comprises an actuator configured to position the optical unit in an optical path towards the image sensor during the first time interval such that the optical unit is effective in the optical path, and configured to position the optical unit outside the optical path during the second time interval such that the optical unit is effectless in the optical path.

20. The imaging system in accordance with claim 18, wherein the projection optics comprise a deformable mirror comprising a reflective surface configured to redirect an optical path between an object region and the image sensor and to change a surface shape of the reflective surface based on a drive signal;
wherein the adjuster is configured to provide the drive signal based on the information relating for the aberration.

21. An imaging system comprising:
a device in accordance with claim 1, wherein the image sensor is a first sensor, and wherein the projection optics is a first projection optics;
a second image sensor;
second projection optics for optically projecting onto the second image sensor; and
an adjuster configured to adjust the second projection optics using the information relating to the aberration such that an influence of the aberration on the projection onto the second image sensor is reduced compared to a state detected by the device.

22. The imaging system in accordance with claim 21, comprising a beam-splitting element arranged such that the beam-splitting element couples out a part of an optical path between the first or second projection optics and the second image sensor such that the projection onto the first image sensor and the projection onto the second image sensor comprise the same optical origin.

23. The imaging system in accordance with claim 21, wherein the first or second projection optics comprise a deformable mirror comprising a reflective surface configured to redirect an optical path between an object region and the second image sensor and to change a surface shape of the reflective surface based on a drive signal;
wherein the adjuster is configured to provide the drive signal based on the information relating to the aberration.

24. A method for measuring an aberration, comprising:
providing an image sensor;
arranging projection optics arranged in an aperture plane of a device or in a plane into which the aperture plane is imaged for optically projecting onto the image sensor;
influencing the optical projection onto the image sensor by an optical unit so that the result is a multiple image of a plurality of sub-images on the image sensor and such that different regions of the optical unit are adapted to deflect only a respective part of the wavefront to a different direction when generating the multiple image, wherein the focus is the same for the entire wavefront;
determining information relating to the aberration based on the multiple image;
wherein the plurality of sub-images overlap partly, wherein the evaluator is configured to evaluate a relative change in a position of the at least one feature in the plurality of sub-images to determine the information relating to the aberration.

25. The device in accordance with claim 1, wherein based on the influence of the optical unit at least one feature occurs in each of the sub-images, wherein the evaluator is configured to evaluate a relative change in a position of the at least one feature in the multiple image to determine the information relating to the aberration.

26. The device of claim 1, wherein the evaluator is configured to determine the information relating to the aberration by determining a cepstrum based on the determination rule $$C(x,y)=\text{Transformation2}(\text{Distortion}(\text{Transform1}))$$

wherein x and y are image directions, C(x, y) refers to the cepstrum relative to the image directions, Transform1 is a transformation into the frequency range, distortion is a distortion function and Transformation2 is an operation inverse to Transform1.

27. The device of claim 26, wherein the evaluator is configured to determine the influence of the aberration based on a detection of side-maximums of the cepstrum.

* * * * *